United States Patent
Iwamatsu et al.

(10) Patent No.: US 6,461,693 B1
(45) Date of Patent: Oct. 8, 2002

(54) LIQUID CRYSTAL COMPOSITION AND LIQUID CRYSTAL LIGHT CONTROL DEVICE USING THE SAME

(75) Inventors: Masako Iwamatsu, Toyonaka; Nobuyuki Kobayashi, Kobe; Hideaki Ueda, Kishiwada, all of (JP)

(73) Assignee: Minolta Co., Ltd., Osaka (JP)

( * ) Notice: Subject to any disclaimer, the term of this patent is extended or adjusted under 35 U.S.C. 154(b) by 131 days.

(21) Appl. No.: 09/670,609

(22) Filed: Sep. 26, 2000

(30) Foreign Application Priority Data

Sep. 30, 1999 (JP) .............................. 11-280866

(51) Int. Cl.⁷ ................. C09K 19/82; C09K 19/20; C09K 19/12; C09K 19/36; G02F 1/13
(52) U.S. Cl. ............. 428/1.1; 252/299.64; 252/299.66; 252/299.67; 349/185
(58) Field of Search ................ 252/299.64, 299.66, 252/299.67; 428/1.1; 349/185

(56) References Cited

U.S. PATENT DOCUMENTS

| | | | |
|---|---|---|---|
| 5,156,763 A | | 10/1992 | Gray et al. ............ 252/299.67 |
| 5,437,815 A | * | 8/1995 | Yamada et al. ........ 252/299.66 |
| 6,274,208 B1 | * | 8/2001 | Iwamatsu et al. ............. 428/1.1 |
| 6,287,647 B1 | * | 9/2001 | Kobayashi et al. .......... 428/1.1 |
| 6,348,961 B2 | * | 2/2002 | Iwamatsu et al. ........... 349/175 |

FOREIGN PATENT DOCUMENTS

| | | | |
|---|---|---|---|
| JP | 7-234394 | * | 9/1995 |
| JP | 10-60441 | * | 3/1998 |

OTHER PUBLICATIONS

English abstract for JP 10–60441, 1998.*
English abstract for JP 7–234394, 1995.*

* cited by examiner

Primary Examiner—Shean C. Wu
(74) Attorney, Agent, or Firm—Sidley Austin Brown & Wood LLP

(57) ABSTRACT

A chiral nematic liquid composition, which exhibits a cholesteric phase at a room temperature, comprising a nematic liquid crystal composition and at least one kind of chiral agent. The nematic liquid crystal composition includes at least one kind of liquid crystal ester compound, at least one kind of liquid crystal terphenyl compound, and at least one kind of liquid crystal tolane compound. This chiral nematic liquid crystal offers superior bidirectional stability, good color purity and reflectance, high contrast, a wide temperature compensation range, and a low voltage driving requirement.

20 Claims, 4 Drawing Sheets

LIQUID CRYSTAL COMPOSITION AND LIQUID CRYSTAL LIGHT CONTROL DEVICE USING THE SAME

CROSS-REFERENCE TO RELATED APPLICATION

This application is based on Japanese Patent Application No. HEI 11-280866 filed on Sep. 30, 1999 in Japan, the entire content of which is hereby incorporated by reference.

BACKGROUND OF THE INVENTION

1. Field of the Invention

The present invention pertains to a liquid crystal composition and a liquid crystal light modulating element using the liquid crystal composition, such as a liquid crystal display.

2. Description of Related Art

In recent years, various types of reflective liquid crystal displays that use chiral nematic liquid crystal that exhibits a cholesteric phase at room temperature and is created by adding a chiral agent to nematic liquid crystal have been studied. These elements perform display by switching the liquid crystal between a planar state (colored) and a focal conic state (transparent) based on the impression of pulse signals having different levels of energy. These elements may also be constructed such that they maintain their colored or transparent state even after the application of voltage is stopped.

It is anticipated that this type of liquid crystal may be used in areas other than the display of moving images in monitors. A representative use is as a replacement for paper on which information such as images and text is printed, such as an electronic blackboard or billboard, an electronic book, or a decoration panel.

However, currently used reflective liquid crystal displays using chiral nematic liquid crystal have an insufficient Y-value (luminous reflectance) and therefore low contrast. Displays having sufficient color purity characteristics do not exist. Moreover, it is important to increase the temperature compensation range for this type of liquid crystal display.

SUMMARY OF THE INVENTION

The principal object of the present invention is to provide an improved chiral nematic liquid crystal composition and liquid crystal light modulating element.

Another object of the present invention is to provide a chiral nematic liquid crystal composition and liquid crystal light modulating element that offer superior bidirectional stability, good color purity and reflectance, high contrast, a wide temperature compensation range and a low drive voltage.

To achieve at least one of the above described objects, a chiral nematic liquid crystal composition according to the present invention comprises: a nematic liquid crystal composition including at least one kind of liquid crystal ester compound, at least one kind of liquid crystal terphenyl compound, and at least one kind of liquid crystal tolane compound; and at least one chiral agent, wherein the chiral nematic liquid crystal composition exhibits a cholesteric phase at room temperature.

A chiral nematic liquid crystal composition exhibiting a cholesteric phase at room temperature, is switched between a selective reflection state, in which the chiral nematic liquid crystal composition selectively reflects light having a specified peak wavelength, and a transparent state, in which it allows all incident light to pass through, by impressing pulse voltages having different energy amounts to the chiral nematic liquid crystal composition.

A liquid crystal ester compound has a large dielectric anisotropy, which increases responsiveness to drive voltage and increases contrast when included in the liquid crystal composition. In particular, it is desirable that the compound includes an F group or a CN group, which would improve the transparency of the chiral nematic liquid crystal composition, allow the drive voltage to be reduced, and increase the range of operating temperatures.

A liquid crystal terphenyl compound has a large refractive anisotropy, which increases scattering, thereby increasing the contrast and increasing the operating temperature range when included in the chiral nematic liquid crystal composition. It also helps to maintain the long-term reliability and stability of the liquid crystal. It is particularly desirable that the compound includes a polar group such as an F group or a Cl group, which would allow the drive voltage to be reduced.

A liquid crystal tolane compound has the effect of reducing viscosity, and including it in the liquid crystal composition can reduce the viscosity of the liquid crystal composition while maintaining high reflectance.

In the chiral nematic liquid crystal composition pertaining to the present invention, the total amount of liquid crystal ester compound and liquid crystal terphenyl compound is preferably at least 50% by weight of the amount of nematic liquid crystal composition. In particular, it is desirable for the amount of liquid crystal terphenyl compound to comprise at least 10% by weight of the amount of nematic liquid crystal composition. Furthermore, it is desirable for the amount of liquid crystal ester compound to comprise at least 30% by weight of the amount of nematic liquid crystal composition.

The nematic liquid crystal composition may also contain at least one type of liquid crystal phenyl cyclohexyl compound. A liquid crystal phenyl cyclohexyl compound contributes to reducing the viscosity and increasing the reflectance of the liquid crystal composition.

It is desirable for the amount of chiral agent contained in the chiral nematic liquid crystal composition to be at least 10% to 45% by weight of the total amount of chiral nematic liquid crystal composition. Maintaining the amount of chiral agent within this range allows the selective reflection wavelength to be set within the desired range without causing crystal separation.

It is furthermore desirable for the nematic liquid crystal composition to have a dielectric anisotropy value between 10 and 30, and ideally between 15 and 30, as well as a refractive anisotropy value between 0.1 and 0.3, and ideally between 0.15 and 0.25.

Pigments or UV-absorbent substances may also be added to the chiral nematic liquid crystal composition. Adding pigments allows the color purity of the chiral nematic liquid crystal composition to be adjusted. Adding UV-absorbent substances prevents deterioration of the chiral nematic liquid crystal composition caused by exposure to ultraviolet light.

According to another aspect of the present invention, a liquid crystal light control device comprises: a liquid crystal light control layer including a chiral nematic liquid crystal composition exhibiting a cholesteric phase at room temperature, the chiral nematic liquid crystal composition comprising: a nematic liquid crystal composition including a liquid crystal ester compound, a liquid crystal terphenyl compound, and a liquid crystal tolane compound; and at least one chiral agent.

This type of liquid crystal light modulating element (i) offers high-contrast display with good color purity and reflectance, (ii) may be driven with good responsiveness at low voltage, and (iii) has a wide temperature compensation range.

BRIEF DESCRIPTION OF THE DRAWINGS

These and other objects, advantages and features of the invention will become apparent from the following description thereof taken in conjunction with the accompanying drawings in which.

DETAILED DESCRIPTION OF THE PREFERRED EMBODIMENTS

The embodiments of the liquid crystal composition and liquid crystal light modulating element pertaining to the present invention will be explained below with reference to the accompanying drawings.

Figure 1A:
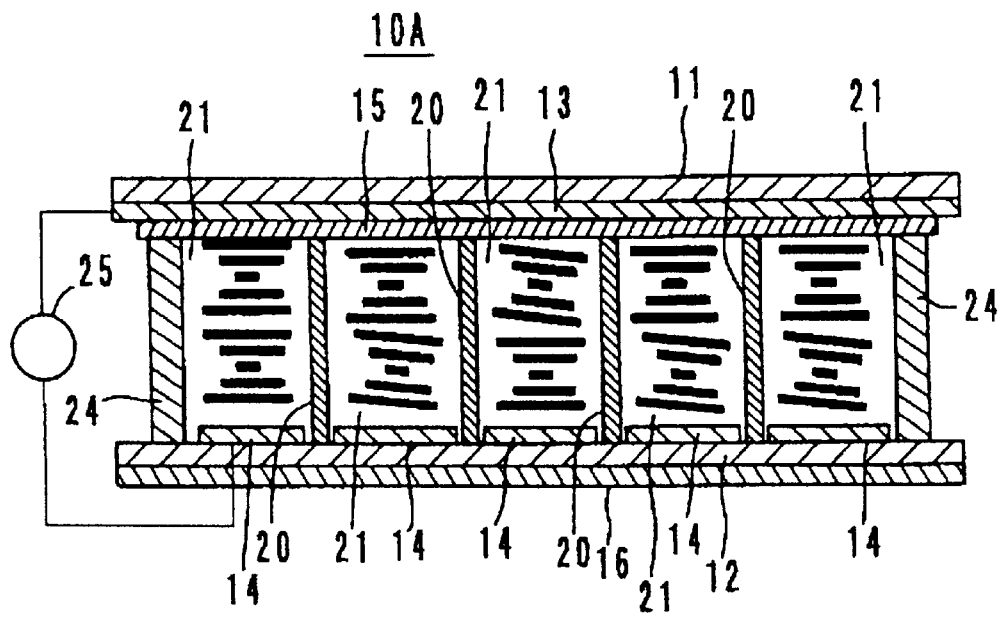
FIGS. 1(A) and 1(B) are cross-sectional views of a first embodiment of the liquid crystal display pertaining to the present invention, with FIG. 1(A) showing the element in the planar state and FIG. 1(B) showing the element in the focal conic state.
Figure 1B:
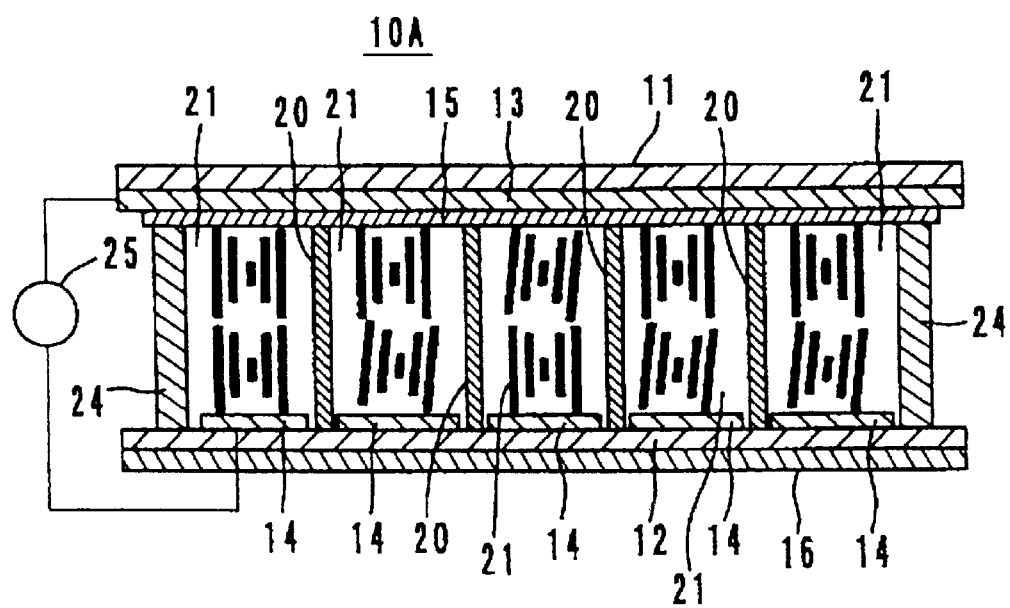

First Embodiment—FIGS. 1(A) and 1(B)

FIGS. 1(A) and 1(B) show the cross-sectional construction of the liquid crystal display 10A comprising a first embodiment of the present invention. FIG. 1(A) shows the planar state (colored display state) caused by the application of a high-voltage pulse, and FIG. 1(B) shows the focal conic state (transparent/black display state) caused by the application of a low-voltage pulse. The liquid crystal composition used here has a memory capability, such that the planar state and the focal conic state are maintained even when the application of the pulse voltage is stopped.

In FIG. 1, 11 and 12 are transparent substrates, and multiple parallel belt-shaped transparent electrodes 13 and 14 are formed on the surfaces of the transparent substrates 11 and 12, respectively, such that they face each other. These electrodes 13 and 14 are also aligned so as to be perpendicular to each other. It is preferable for the electrodes 13 to be coated by an insulating film 15. In addition, a visible light absorbing layer 16 is formed on the substrate 12 where necessary. Alternatively, rather than forming a visible light absorbing layer 16, the substrate 12 itself may be given a visible light absorbing capability.

20 are column-shaped resin bodies that serve as to maintain the space between the substrates 11 and 12. 21 is a chiral nematic liquid crystal composition that exhibits a cholesteric phase at room temperature. The materials and combinations of these substances are explained below, and are explained in more detail in connection with the experiment examples. 24 is a sealing material that seals the chiral nematic liquid crystal composition 21 inside the substrates 11 and 12. 25 is a pulse power supply that applies prescribed pulse-shaped voltages to the electrodes 13 and 14.

Figure 2A:
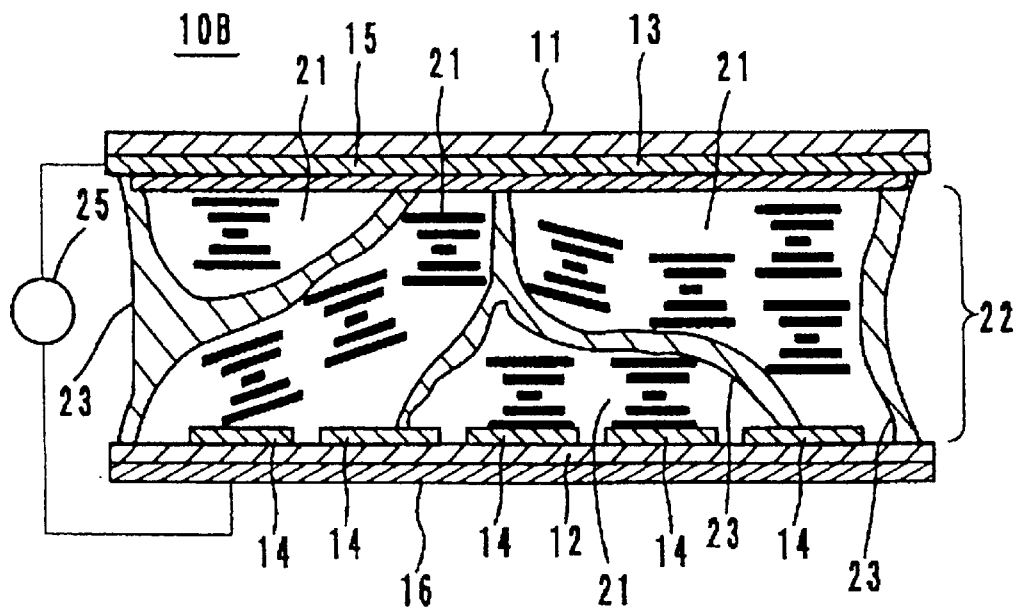
FIGS. 2(A) and 2(B) are cross-sectional views of a second embodiment of the liquid crystal display pertaining to the present invention, with FIG. 2(A) showing the element in the planar state and FIG. 2(B) showing the element in the focal conic state.
Figure 2B:
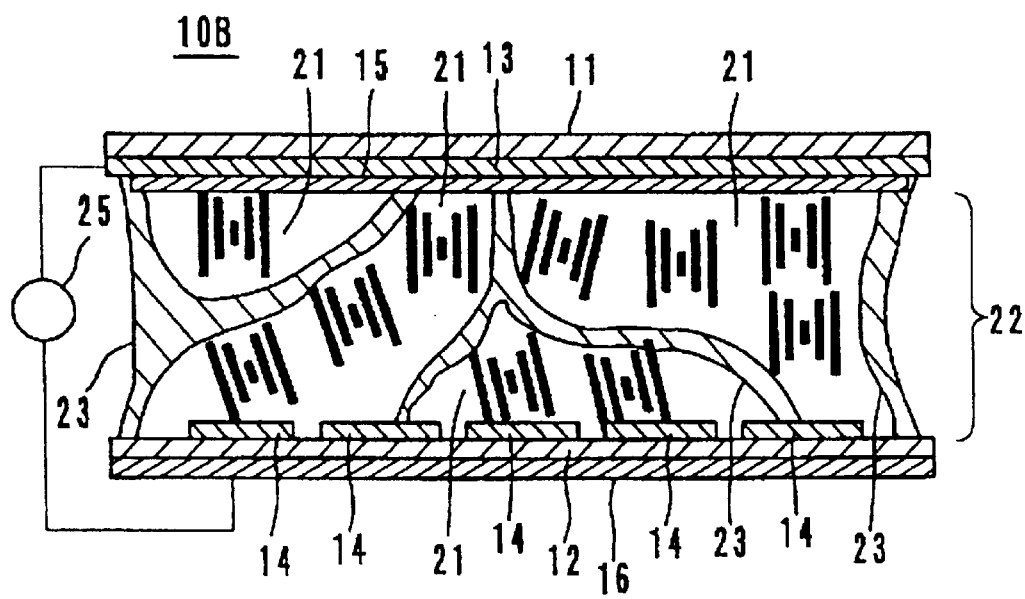

Second Embodiment—FIGS. 2(A) and 2(B)

FIGS. 2(A) and 2(B) show the cross-sectional construction of the liquid crystal display 10B comprising a second embodiment of the present invention. FIG. 2(A) shows the planar state (colored display state) caused by the application of a high-voltage pulse, and FIG. 2(B) shows the focal conic state (transparent/black display state) caused by the application of a low-voltage pulse. These two types of states are maintained even when the application of the pulse voltage is stopped, as in the first embodiment.

The liquid crystal display 10B is a resin network type display formed by a composite film 22 comprising a chiral nematic liquid crystal composition 21 and a three-dimensional lattice-shaped resin network 23. The composite film 22 is made by mixing the chiral nematic liquid crystal composition together with a prescribed proportion of a resin substance to which a photopolymerization initiator is added, whereupon the mixture is irradiated with ultraviolet light to polymerize the resin substance. For the chiral nematic liquid crystal composition 21, the materials described below may be used. The other components are identical to those in the first embodiment, and are identified by the same symbols used in that embodiment.

Figure 3:
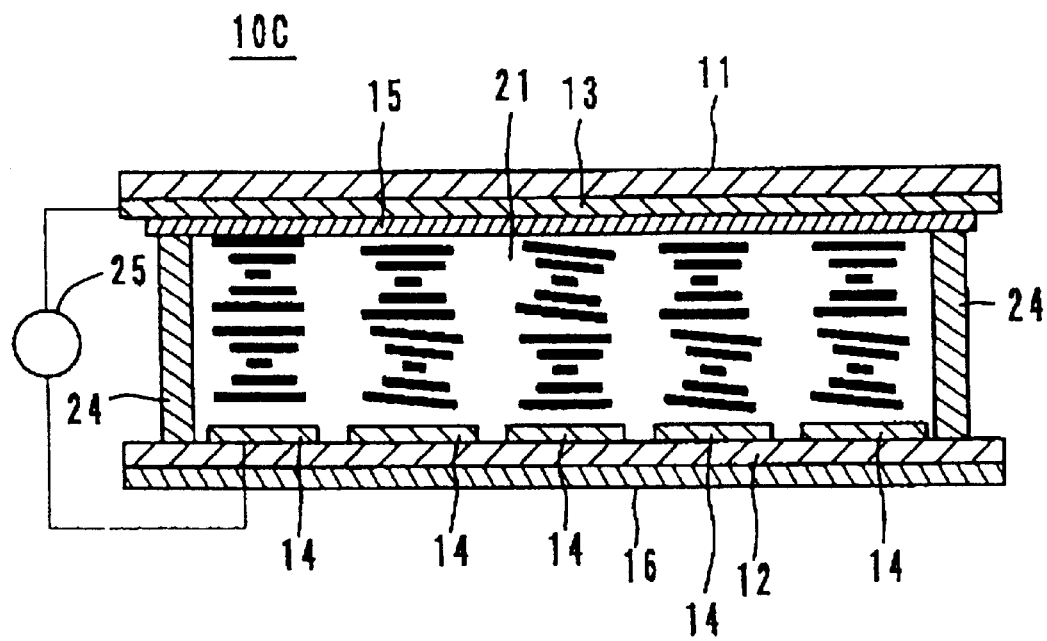
FIG. 3 is a cross-sectional view of a third embodiment of the present invention.

Third Embodiment—FIG. 3

FIG. 3 shows the cross-sectional construction of a liquid crystal display 10C (in a planar state, after application of a high-voltage pulse) comprising a third embodiment of the present invention. This liquid crystal display has the same basic construction as the first embodiment shown in FIG. 1, but there are no column-shaped bodies in the display area. In FIG. 3, the same members that are shown in FIG. 1 are assigned the same symbols.

Figure 4:
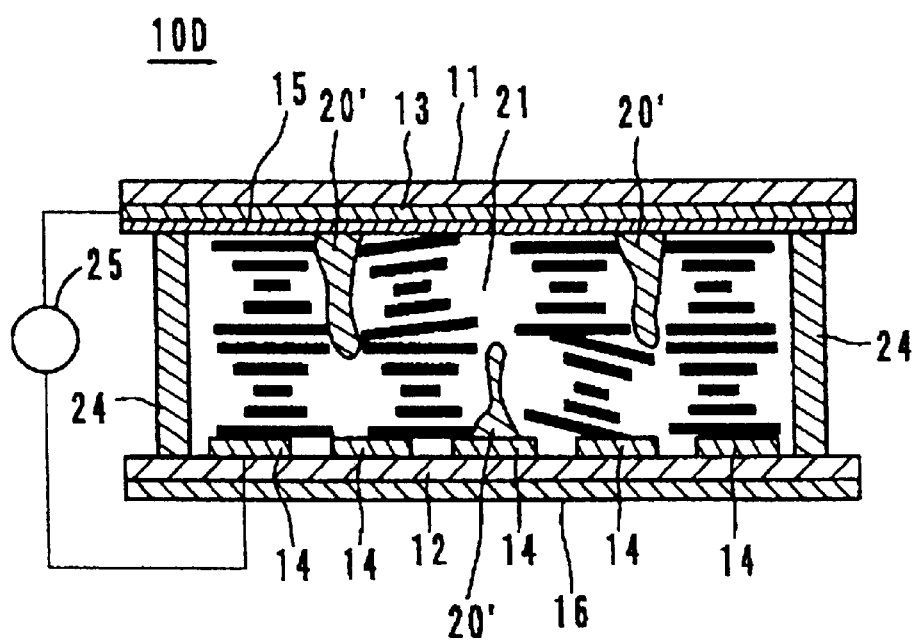
FIG. 4 is a cross-sectional view of a fourth embodiment of the present invention.

Fourth Embodiment—FIG. 4

FIG. 4 shows the cross-sectional construction of a liquid crystal display 10D (in a planar state, after application of a high-voltage pulse) comprising a fourth embodiment of the present invention. This liquid crystal display 10D comprises the liquid crystal display 10C of the third embodiment, with small column-shaped bodies 20' formed to extend into the center area of the space between the substrates 11 and 12. In FIG. 4, the same members that are shown in FIG. 3 are assigned the same symbols.

Figure 5:
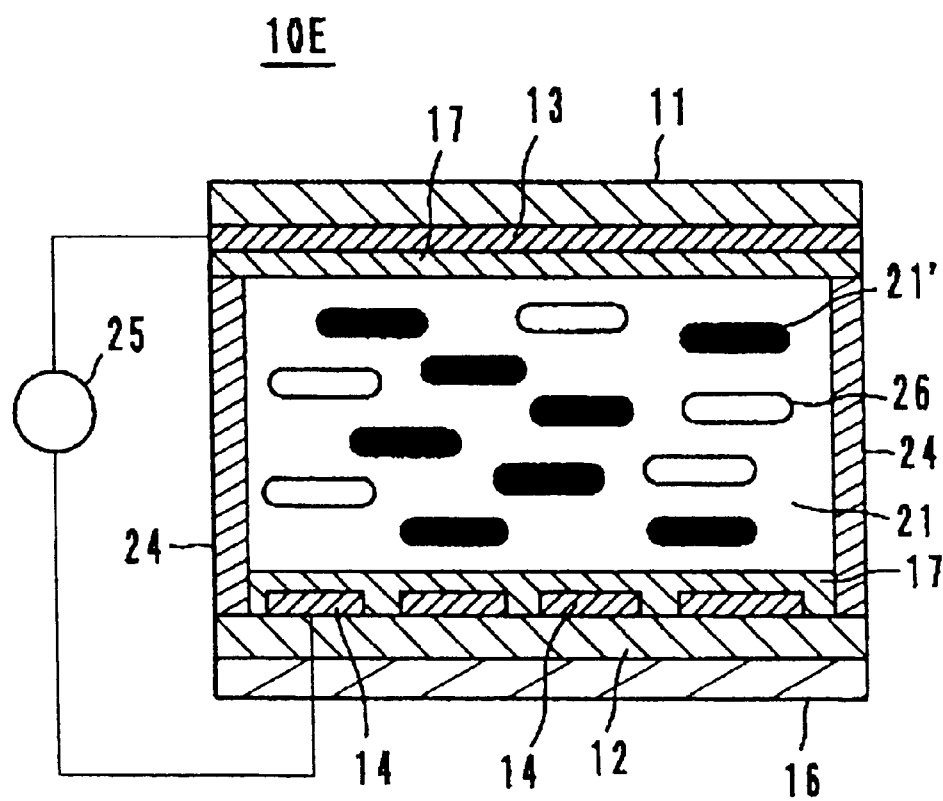
FIG. 5 is a cross-sectional view of a fifth embodiment of the present invention.

Fifth Embodiment—FIG. 5

FIG. 5 shows the cross-sectional construction of a liquid crystal display 10E comprising a fifth embodiment of the present invention. This liquid crystal display 10E comprises a guest-host type liquid crystal composition 21 that is obtained by adding a dichroic pigment 26 to a host liquid crystal 21'. In addition, orientation control films 17 are formed on the electrode surfaces of the substrates 11 and 12. In FIG. 5, the same members that are shown in FIG. 3 are assigned the same symbols.

Display Method

The liquid crystal displays 10A through 10E having the constructions described above perform display through the application of a pulse voltage from the power supply 25 to the electrodes 13 and 14. In other words, where liquid crystal that exhibits a cholesteric phase is used for the chiral nematic liquid crystal composition 21, when a relatively high-energy pulse voltage is impressed to the liquid crystal composition, the liquid crystal enters a planar state, and light having the wavelength determined based on the helical pitch and the reflectance of the liquid crystal is selectively reflected. When a relatively low-energy pulse voltage is impressed to the chiral nematic liquid crystal composition, the composition enters a focal conic state in which the composition becomes transparent. It is also possible to construct the liquid crystal displays of the embodiments such that each state is maintained even after the application of voltage is stopped.

It has also been determined that an intermediate state between the focal conic state and the planar state exists, and it is possible to perform halftone display through the application of an intermediate energy pulse voltage. This intermediate state is considered a mixture of the planar state and the focal conic state, and it is possible to construct the liquid crystal displays of the embodiments such that this intermediate state is maintained even after the application of voltage is stopped. In addition, as shown in the drawings, when a light absorbing layer 16 is formed on the back side (the side opposite the side of observation), black display is performed when the chiral nematic liquid crystal composition is in the focal conic state.

In these liquid crystal displays, the locations at which the belt-shaped electrodes 13 and 14 intersect in a matrix fashion each comprise individual pixels. In this specification, the area where light modulation is performed by means of the liquid crystal composition is termed the light modulation area, and the area around this area where light modulation is not performed is termed the non-modulation area. In the liquid crystal displays of the embodiments, the light modulation area comprises the display area.

Substrates

At least one of the substrates 11 and 12 must be transparent to light. In addition to glass, a flexible substrate such as polycarbonate, polyether sulfone or polyethylene terephthalate may be used as the transparent substrate.

Electrodes

For the electrodes 13 and 14, transparent conductive film such as ITO (indium tin oxide) or other transparent conductive film, metal electrodes made of aluminum or silicon, or photoconductive film such as amorphous silicone or BSO (bismuth silicon oxide) may be used. After the ITO film is formed on the substrates 11 and 12 through sputtering, for example, the electrodes 13 and 14 may be formed into a belt shape via patterning using photolithography.

Insulating Film, Orientation Control Film, Color Filter

The insulating film 15 comprises an inorganic film made of silicon oxide or an organic film made of polyimide resin, epoxy resin, acrylic resin or urethane resin, and serves to prevent short-circuiting of the electrodes 13 and 14, and as a gas barrier layer to improve the reliability of the liquid crystal. Polyimide resin or silicon resin may be used as an orientation control film. Moreover, if a pigment is added, the film functions as a color filter as well. The material used for the high-polymer bodies in the column-shaped bodies 20 may also be used as the insulating film or the orientation control film.

Spacers

While not shown in connection with the embodiments, spacers may be located between the substrates 11 and 12. The spacers maintain the gap between the substrates 11 and 12 at a uniform distance, and may comprise, for example, spheres made of resin or an inorganic oxide compound. Therefore, the spacers only may be used as the material to maintain the gap between the substrates, without using the column-shaped bodies 20.

Chiral Nematic Liquid Crystal Composition

The chiral nematic liquid crystal composition of the present invention comprises nematic liquid crystal composition and chiral agent, and exhibits cholesteric phase at room temperature. The nematic liquid crystal composition contains a liquid crystal ester compound, a liquid crystal phenyl compound and a liquid crystal tolane compound as its principal components. Furthermore, a liquid crystal component such as a liquid crystal phenyl cyclohexyl compound, a liquid crystal polycyclic compound and/or an N-type (non-polar) compound may be included in the chiral nematic liquid crystal composition as well. Pigments and/or UV-absorbent substances may also be added.

Chiral nematic liquid crystal composition allows the selective reflection wavelength to be adjusted by means of the amount of chiral agent added to the nematic liquid crystal composition, thereby allowing the selective reflection wavelength to be set either inside or outside the range of visible light. Generally, when the amount of chiral agent is increased, the selective reflection wavelength shifts in the direction of the shorter wavelengths. The selective reflection wavelength refers to the peak wavelength in the visible light range within the reflected light components when a pulse voltage is impressed to the electrodes 13 and 14, causing the chiral nematic liquid crystal composition to enter a planar state.

A liquid crystal ester compound has a large dielectric anisotropy, which increases responsiveness to drive voltage and transparency when included in the chiral nematic liquid crystal composition, so that the contrast increases. In particular, it is desirable that the compound includes an F group or a CN group (ideally located at the end of the molecule), which improves the transparency of the chiral nematic liquid crystal composition, allows the drive voltage to be reduced, and increases the range of operating temperatures.

A liquid crystal terphenyl compound has a large refractive anisotropy, which increases scattering, thereby increasing the contrast and increasing the operating temperature range when included in the chiral nematic liquid crystal composition. It also helps to maintain the long-term reliability and stability of the chiral nematic liquid crystal composition. It is particularly desirable that the compound includes a polar group such as an F group or a Cl group (ideally at the end of the molecule), which allows the drive voltage to be reduced. It is preferred that the compound has a Cl group at the end of the molecule and include one or more F groups.

The liquid crystal tolane compound offsets the viscosity of the relatively high-viscosity liquid crystal ester compound and liquid crystal terphenyl compound, thereby increasing the responsiveness of the liquid crystal composition. By including this compound in the chiral nematic liquid crystal composition, the viscosity of the chiral nematic liquid crystal composition may be reduced while maintaining a high refractive index.

A liquid crystal phenyl cyclohexyl compound helps to reduce the viscosity and increase the refractive index of the chiral nematic liquid crystal composition.

In this chiral nematic liquid crystal composition, it is desirable for the total amount of liquid crystal ester compound and liquid crystal terphenyl compound to comprise at least 50% by weight of the amount of nematic liquid crystal composition. It is also desirable for the total amount of liquid crystal ester compound and liquid crystal tolane compound to comprise at least 40% by weight of the amount of nematic liquid crystal composition.

In particular, it is desirable for the amount of liquid crystal terphenyl compound to comprise at least 10% by weight of the amount of nematic liquid crystal composition. The upper limit is 40%, but the preferred percentage is 30%. It is desirable for the amount of liquid crystal ester compound to comprise at least 30% by weight of the amount of nematic liquid crystal composition, but the preferred minimum percentage is at least 40%. The upper limit is 70%, but the preferred upper percentage is 60%.

Regarding the physical properties of the chiral nematic liquid crystal composition, it is desirable for the reflective anisotropy value to be between 0.1 and 0.3, but the preferred value is between 0.15 and 0.25. If the reflective anisotropy value is too small, there are too few scattering components, the color becomes faded in the planar state, and a sufficient reflectance cannot be obtained. Conversely, if the reflective anisotropy value is too large, there are too many scattering components, and transparent and black display in the focal conic state become poor (i.e., the display becomes insufficiently transparent), thereby reducing display performance. In other words, in order to obtain good transparency and color while maintaining sufficient contrast, the reflective anisotropy value should be maintained in the range described above.

It is furthermore desirable for the dielectric anisotropy value to be at least 10, but the preferred value is at least 15. The upper limit is 40, but the preferred value is 30. If the dielectric anisotropy value is too large, the long-term reliability of the chiral nematic liquid crystal composition is affected, while if it is too small, the drive voltage increases to a high level.

The general chemical formulae (A) and (A') and specific formulae (A1) through (A69) and (A'1) through (A'40) for the usable liquid crystal ester compound are shown below.

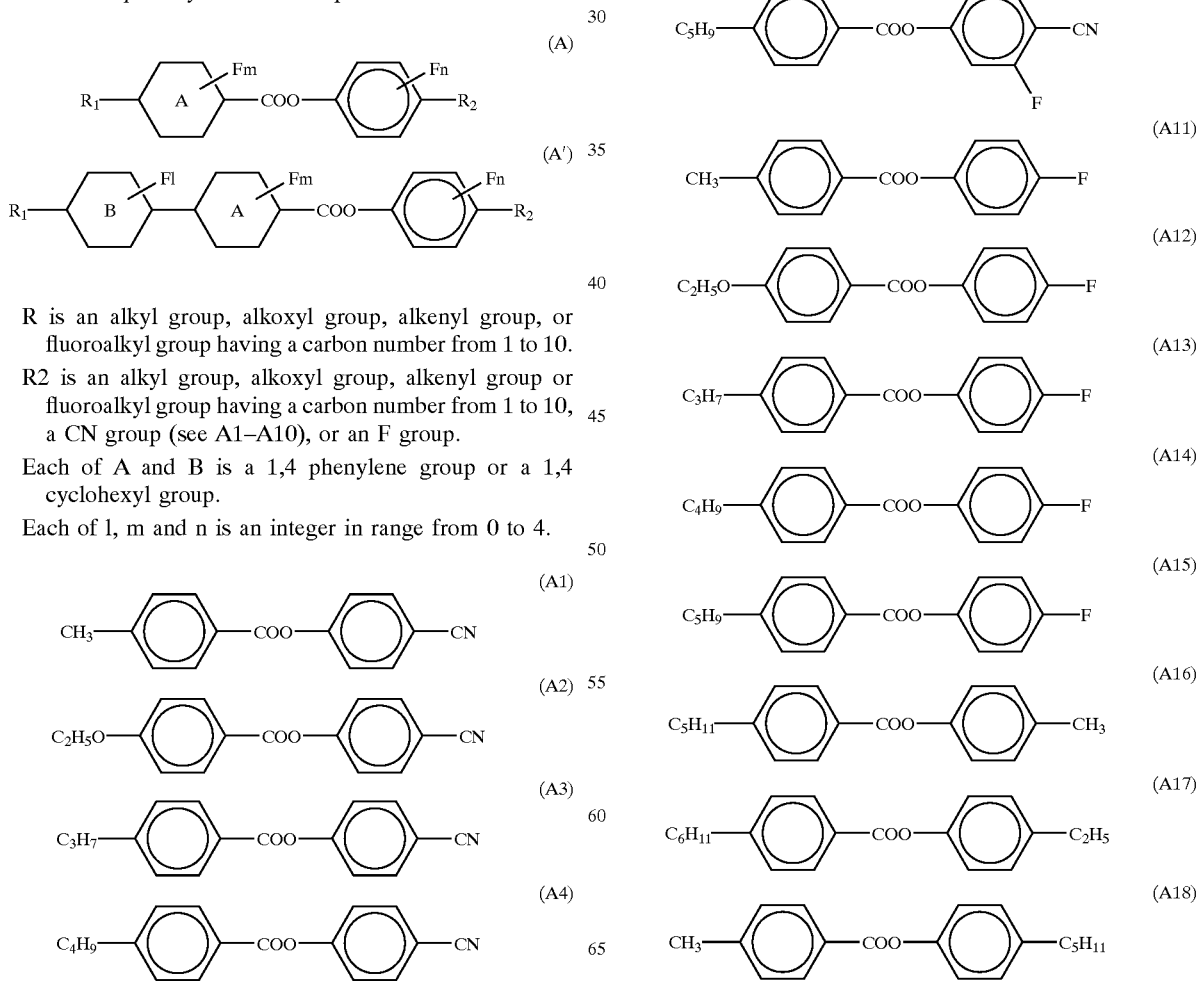

R is an alkyl group, alkoxyl group, alkenyl group, or fluoroalkyl group having a carbon number from 1 to 10.

R2 is an alkyl group, alkoxyl group, alkenyl group or fluoroalkyl group having a carbon number from 1 to 10, a CN group (see A1–A10), or an F group.

Each of A and B is a 1,4 phenylene group or a 1,4 cyclohexyl group.

Each of l, m and n is an integer in range from 0 to 4.

(A19) C₂H₅O–⟨⟩–COO–⟨⟩–C₃H₇

(A20) C₃H₇–⟨⟩–COO–⟨⟩–OC₂H₅

(A21) CF₃–⟨⟩–COO–⟨⟩–C₅H₁₁

(A22) C₆H₁₃–⟨⟩–COO–⟨⟩–OCH₃

(A23) CH₃–⟨⟩–COO–⟨⟩(F)–F (A24) C₂H₅O–⟨⟩–COO–⟨⟩(F)–F (A25) C₃H₇–⟨⟩–COO–⟨⟩(F)–F (A26) C₄H₉–⟨⟩–COO–⟨⟩(F)–F (A27) C₅H₉–⟨⟩–COO–⟨⟩(F)–F (A28) C₆H₁₃–⟨⟩–COO–⟨⟩(F)–F (A29) C₂H₅–⟨⟩(F)–COO–⟨⟩(F)–CN (A30) C₃H₇O–⟨⟩(F)–COO–⟨⟩(F)–CN (A31) C₅H₉–⟨⟩(F)–COO–⟨⟩(F)–CN (A32) C₂H₅–⟨⟩–COO–⟨⟩(F,F)–CN (A33) C₄H₉O–⟨⟩–COO–⟨⟩(F,F)–CN (A34) C₂F₅–⟨⟩–COO–⟨⟩(F,F)–CN (A35) C₆H₁₁–⟨⟩–COO–⟨⟩(F,F)–CN (A36) C₄F₉–⟨⟩–COO–⟨⟩(F,F)–C₂H₅

(A37) C₂H₅O–⟨⟩–COO–⟨⟩(F,F)–C₃H₇

(A38) C₂F₅–⟨⟩–COO–⟨⟩(F,F)–C₄H₉

(A39) CH₃–⟨⟩(F)–COO–⟨⟩(F)–C₅H₁₁

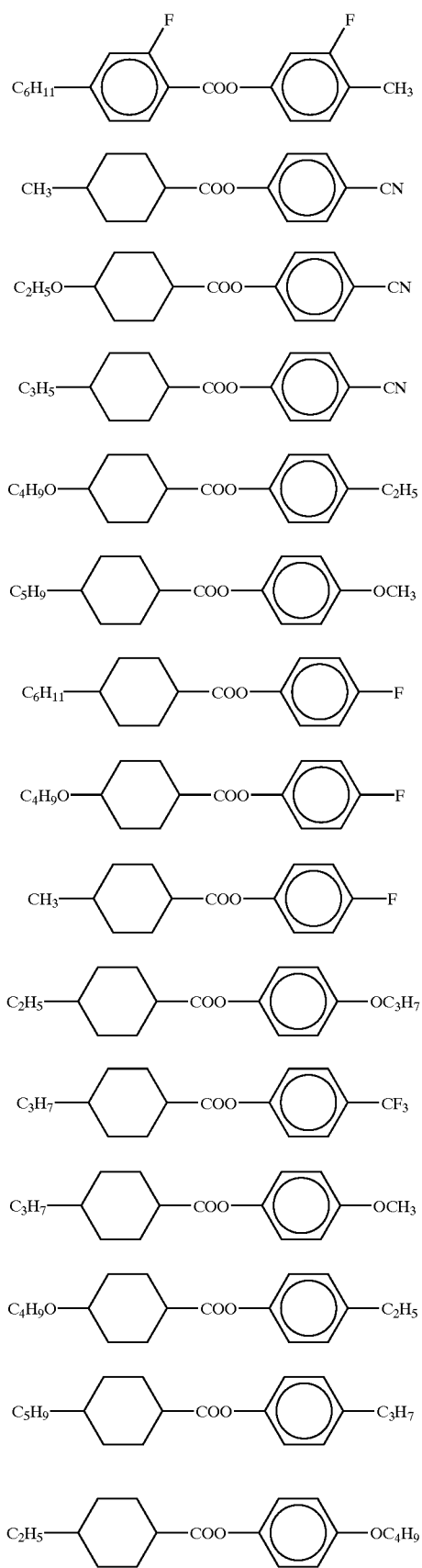
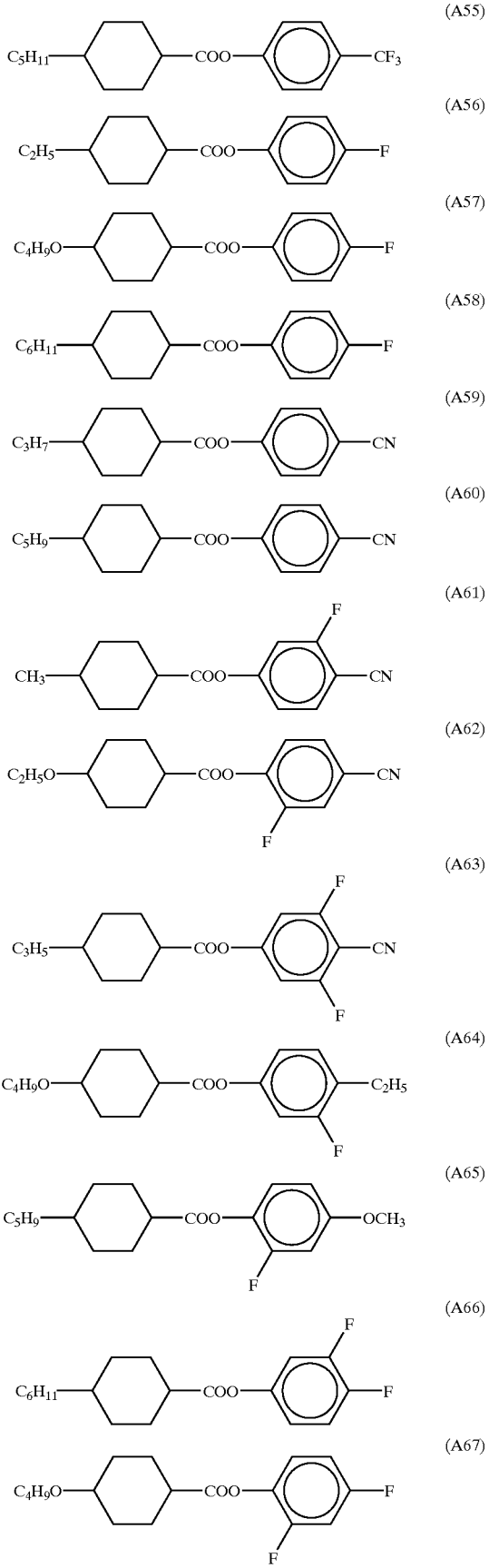

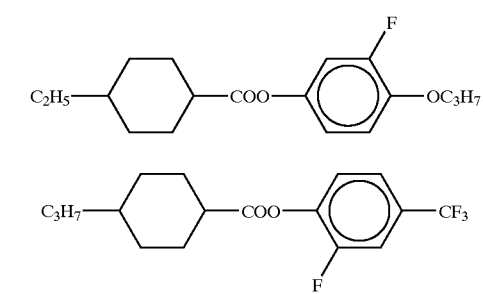 (A68)
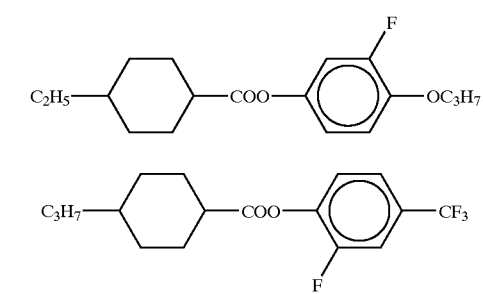 (A69)
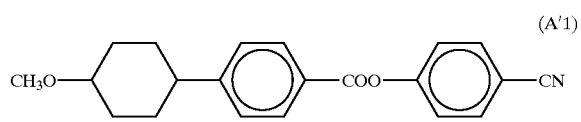 (A'1)
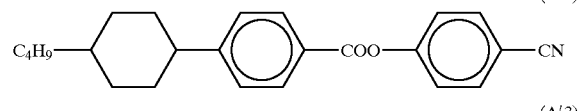 (A'2)
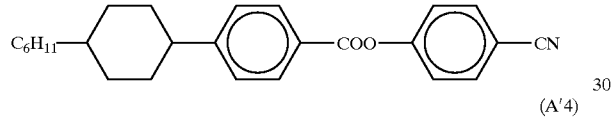 (A'3)
 (A'4)
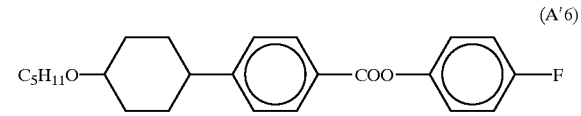 (A'5)
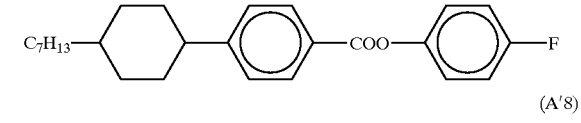 (A'6)
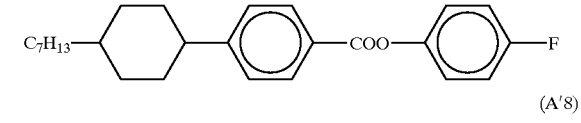 (A'7)
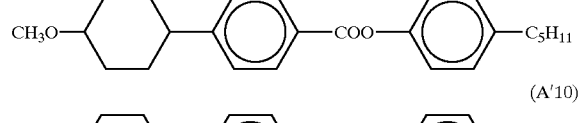 (A'8)
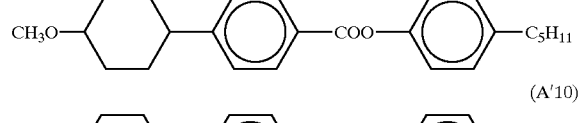 (A'9)
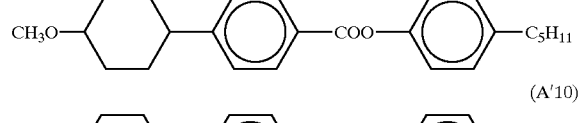 (A'10)
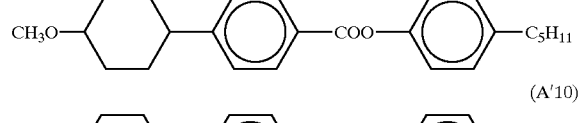 (A'11)
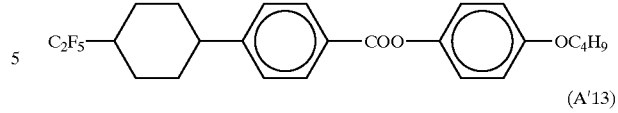 (A'12)
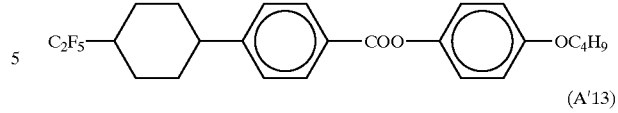 (A'13)
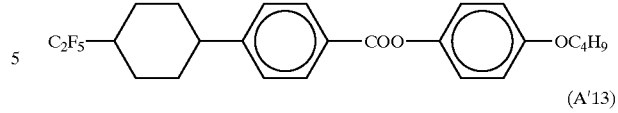 (A'14)
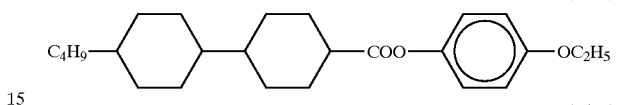 (A'15)
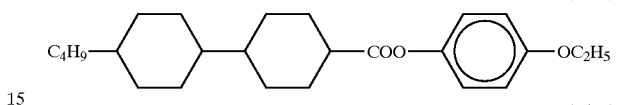 (A'16)
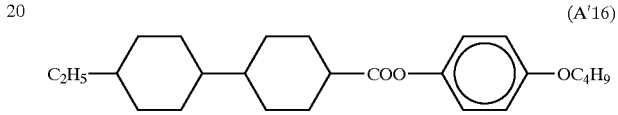 (A'17)
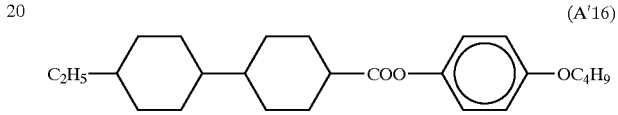 (A'18)
 (A'19)
 (A'20)
 (A'21)
 (A'22)
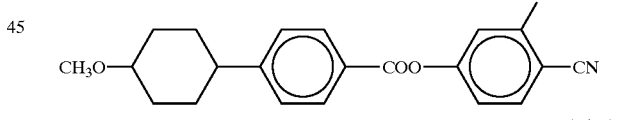 (A'23)
 (A'24)
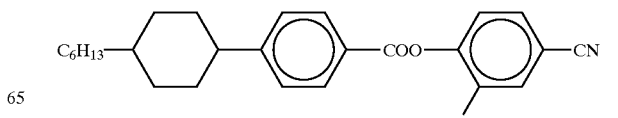

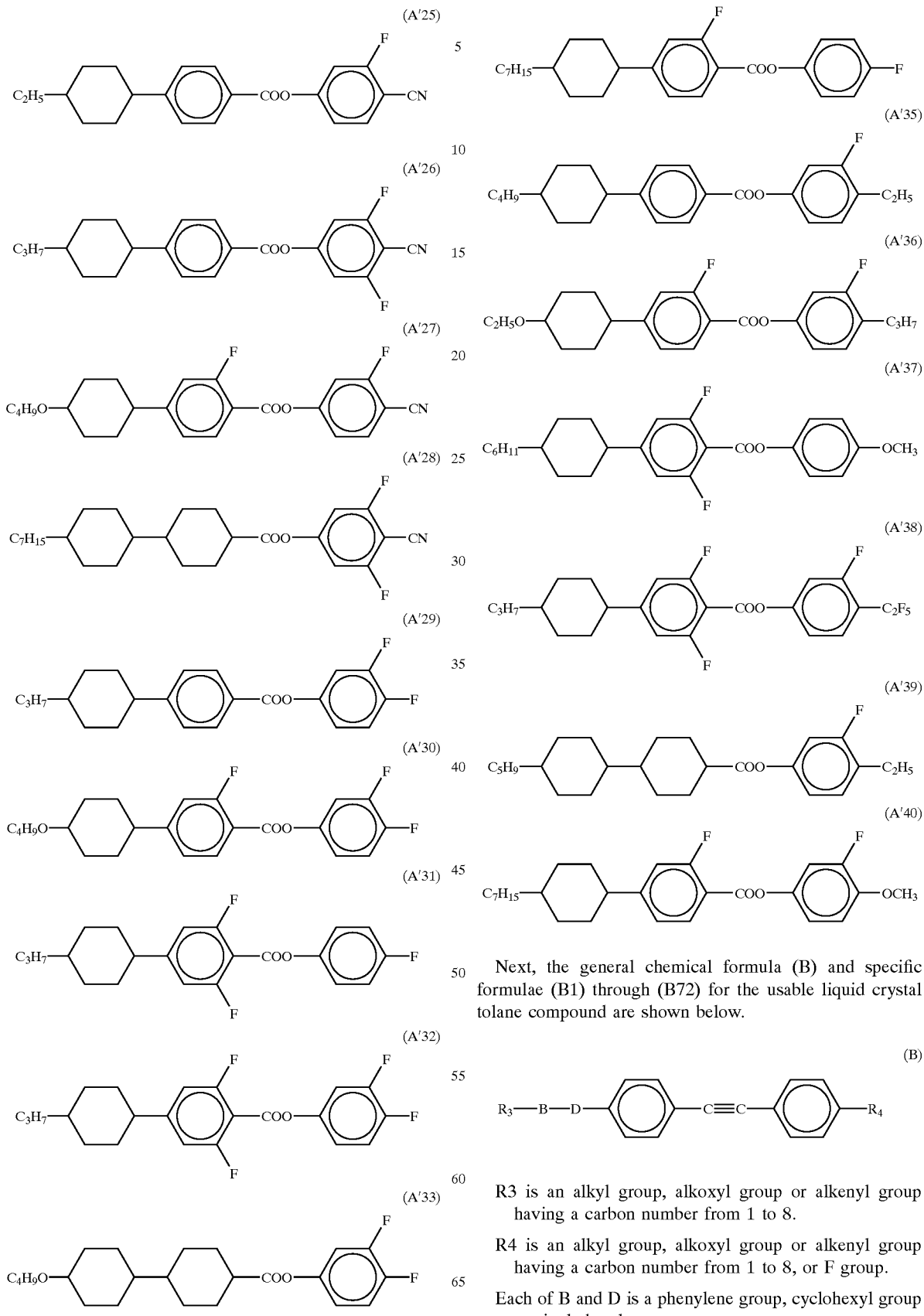

Next, the general chemical formula (B) and specific formulae (B1) through (B72) for the usable liquid crystal tolane compound are shown below.

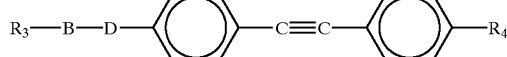

R3 is an alkyl group, alkoxyl group or alkenyl group having a carbon number from 1 to 8.

R4 is an alkyl group, alkoxyl group or alkenyl group having a carbon number from 1 to 8, or F group.

Each of B and D is a phenylene group, cyclohexyl group or single bond.

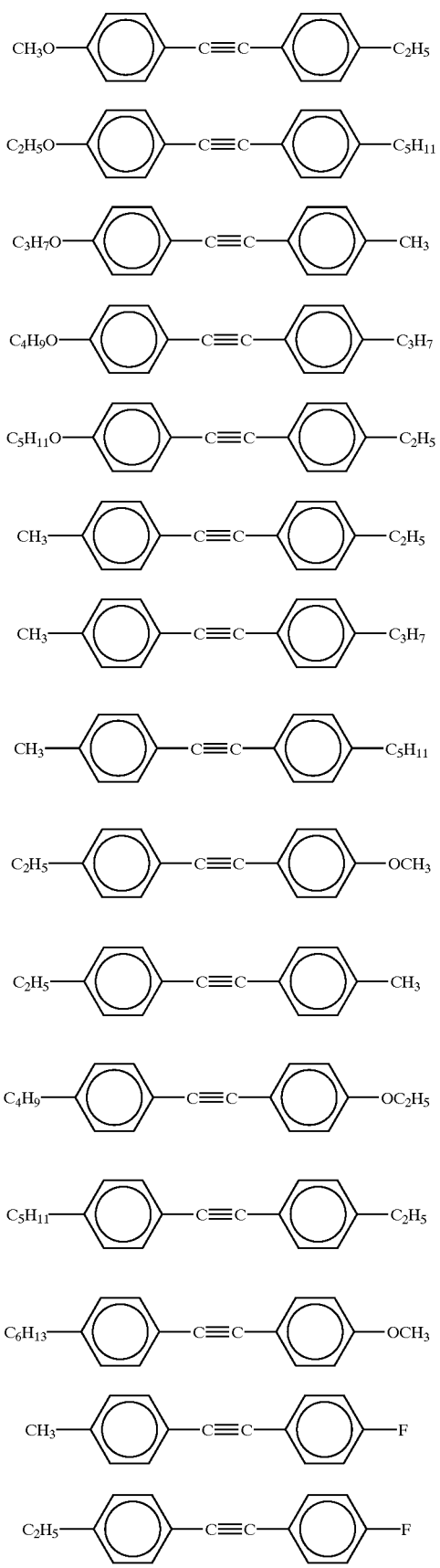
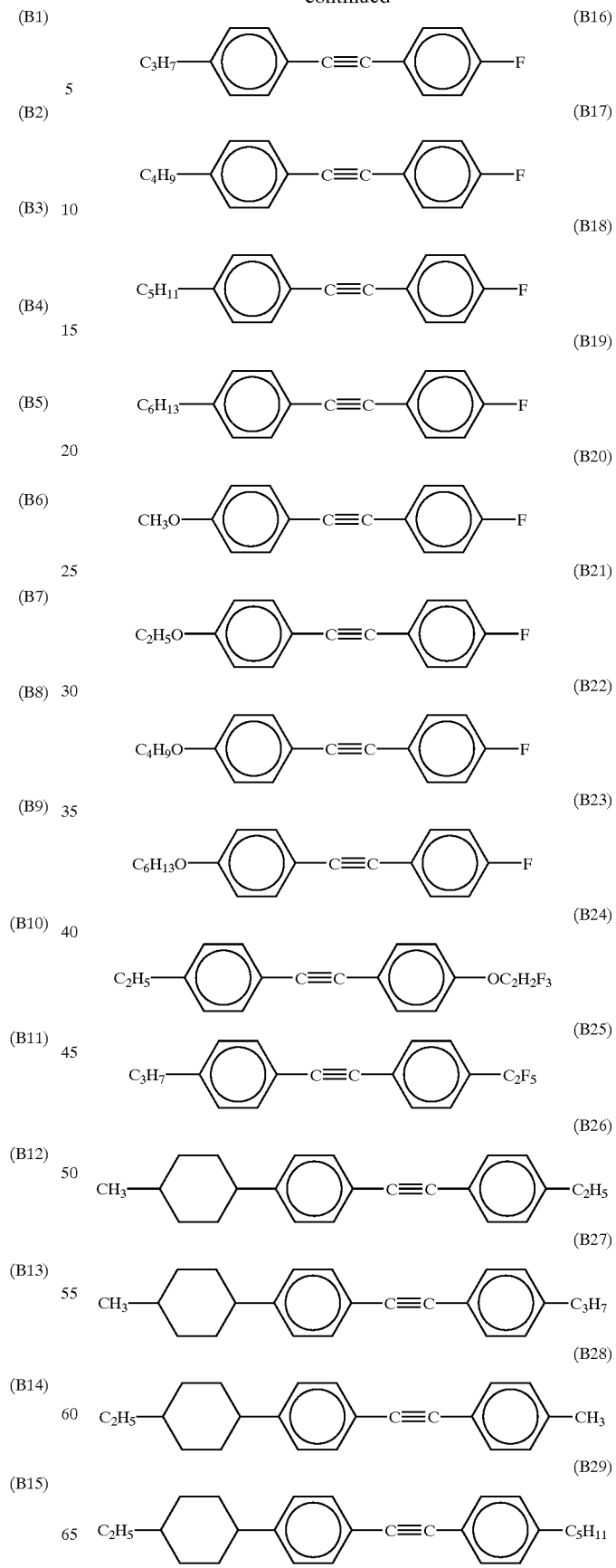

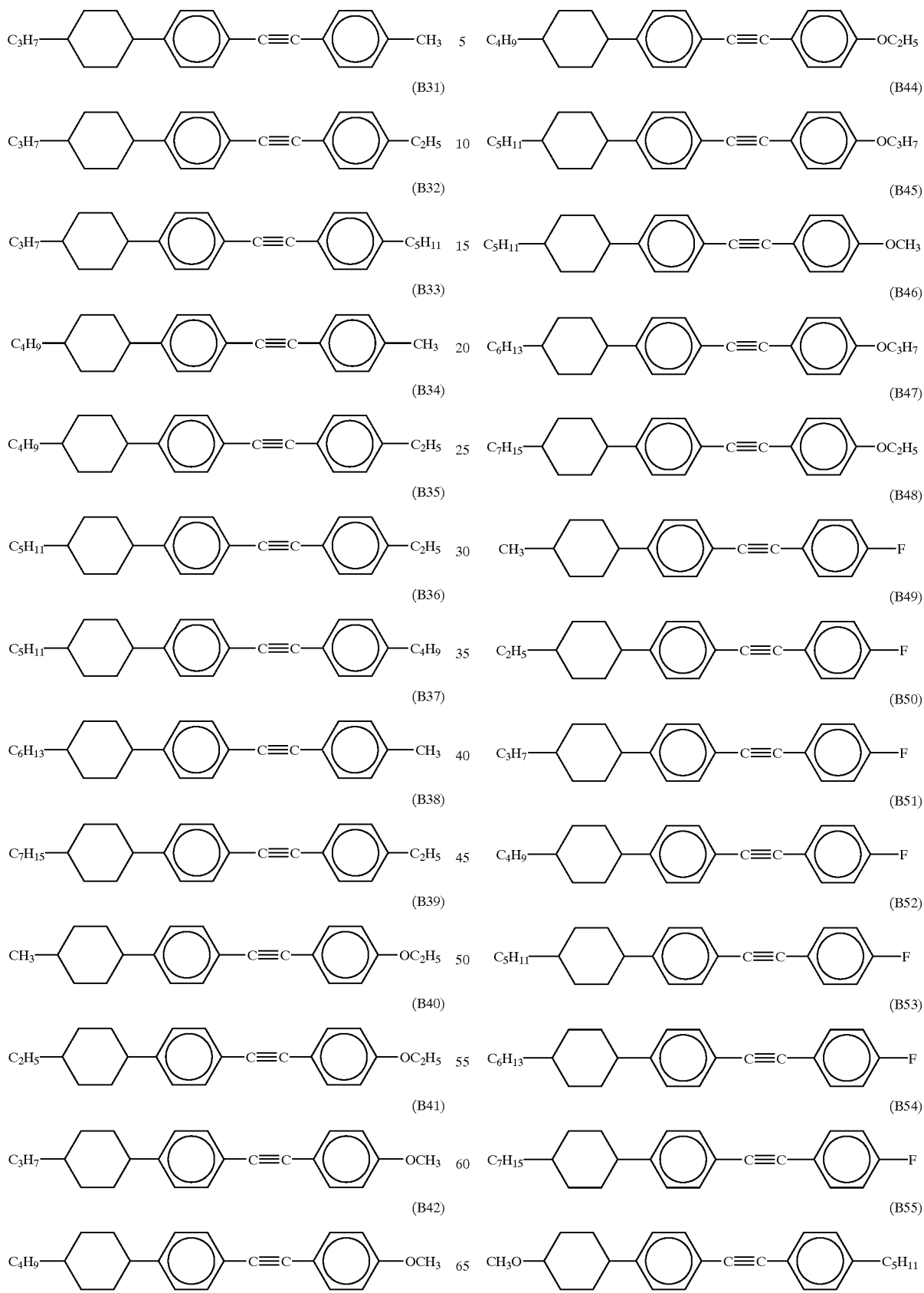

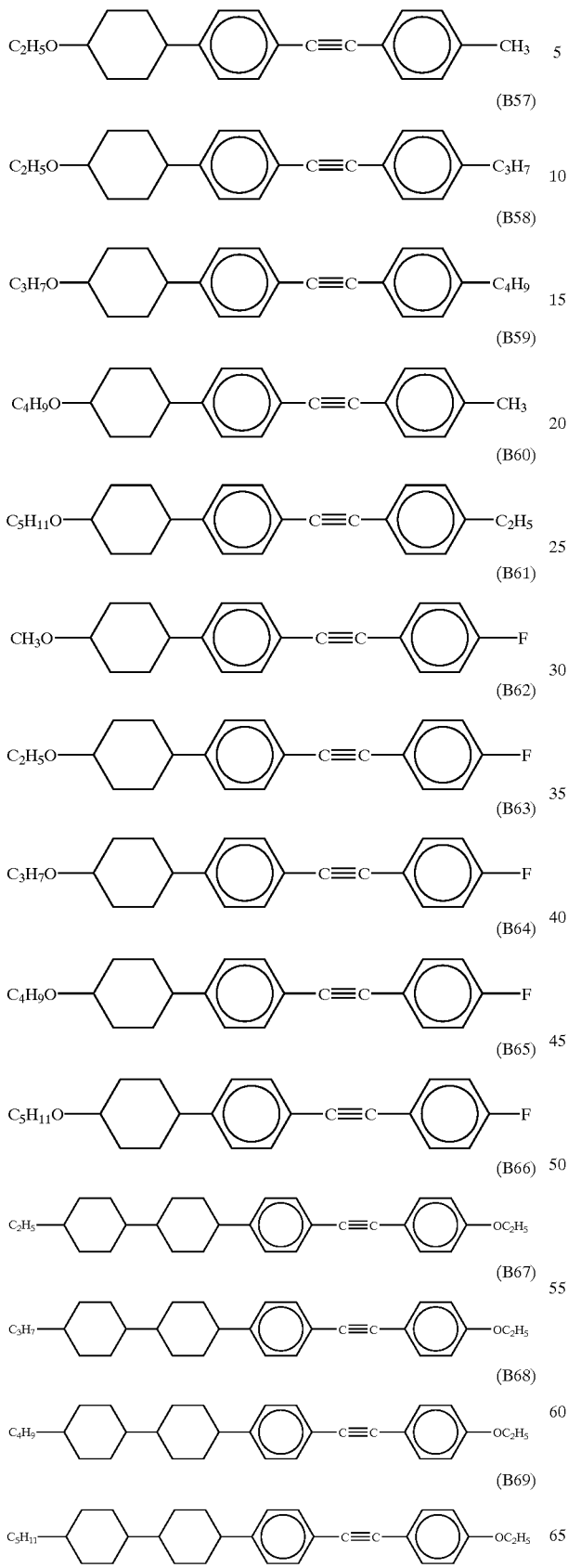

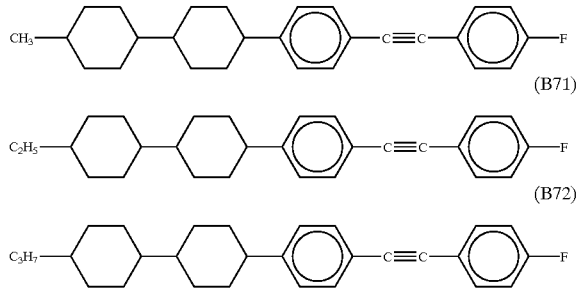

Next, the general chemical formula (C) and specific formulae (C1) through (C48) for the usable liquid crystal terphenyl compound are shown below.

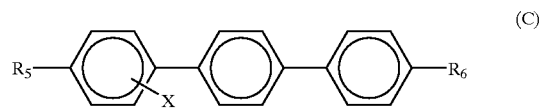

R5 is an alkyl group, alkoxyl group or alkenyl group having a carbon number from 1 to 8.

Each of X, Y and Z is an F group, Cl group or H group.
Each of a, b, and c is an interger in range from 0 to 1.

R6 is an alkyl group, alkoxyl group or alkenyl group having a carbon number from 1 to 8, F group, Cl group, or CN group.

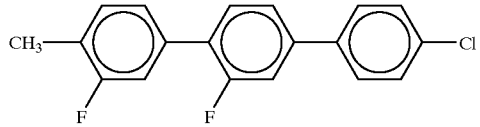

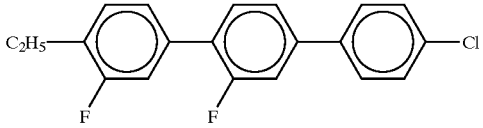

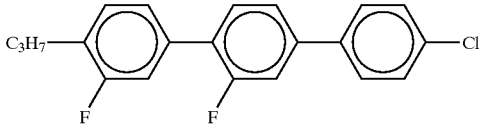

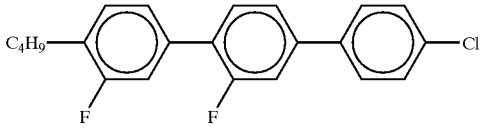

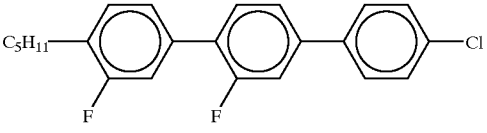

-continued
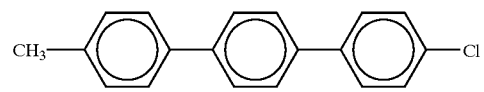
(C6)
(C7)
(C8)
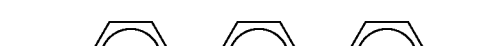
(C9)
(C10)
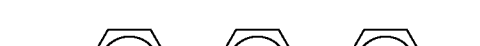
(C11)
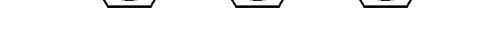
(C12)
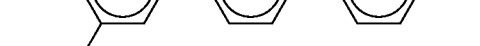
(C13)
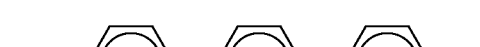
(C14)
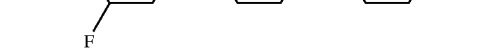
(C15)
(C16)
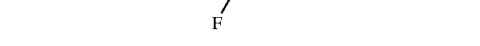
-continued
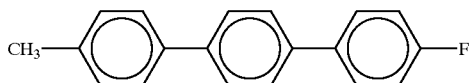
(C17)
(C18)
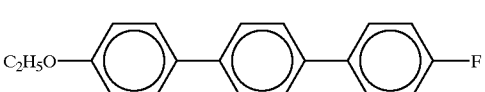
(C19)
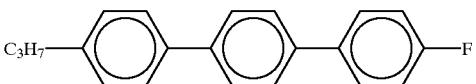
(C20)
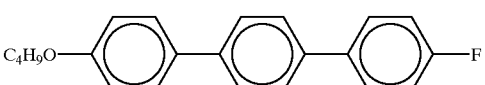
(C21)
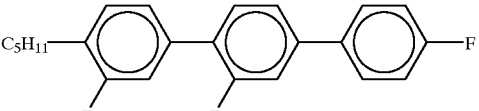
(C22)
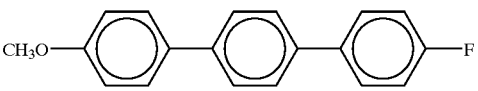
(C23)
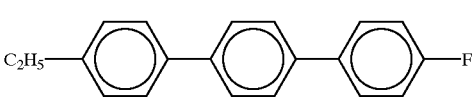
(C24)
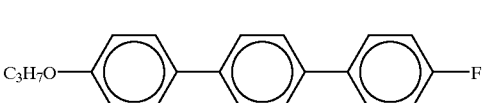
(C25)
(C26)
(C27)
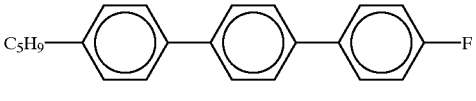
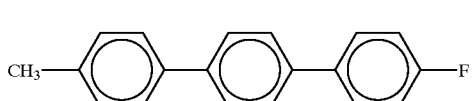

(C28) 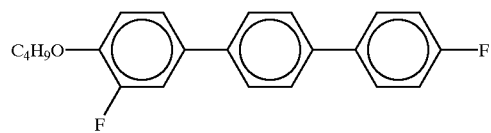
(C29) 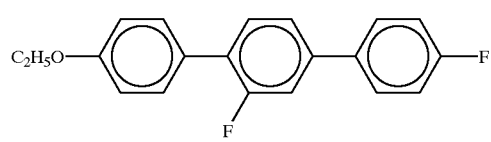
(C30) 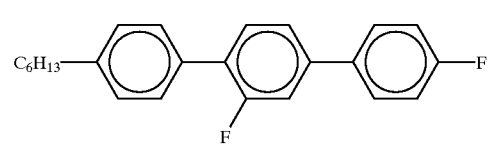
(C31) 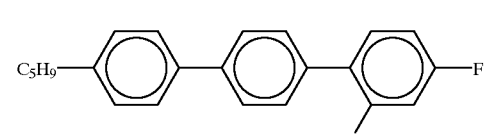
(C32) 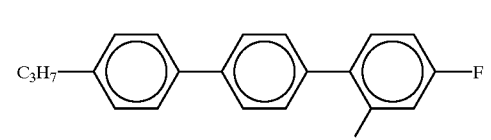
(C33) 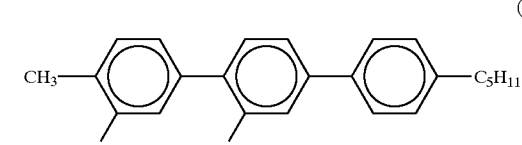
(C34) 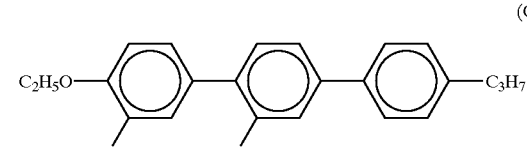
(C35) 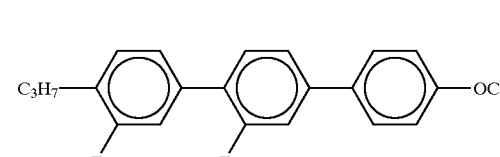
(C36) 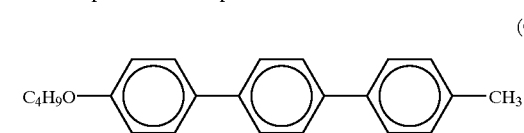
(C37) 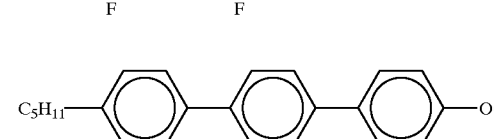
(C38) 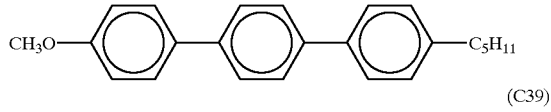
(C39) 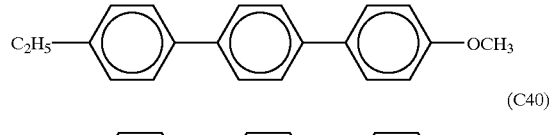
(C40) 
(C41) 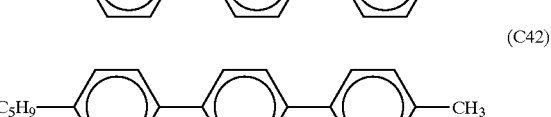
(C42) 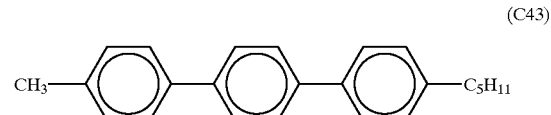
(C43) 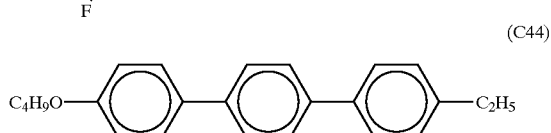
(C44) 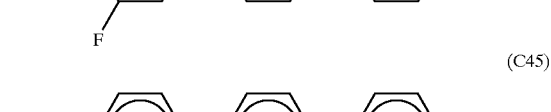
(C45) 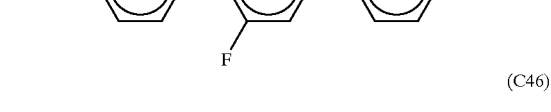
(C46) 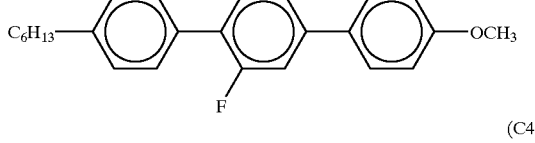
(C47) 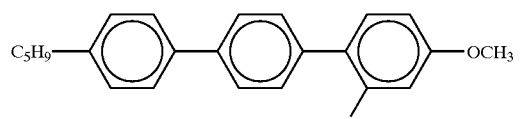
(C48) 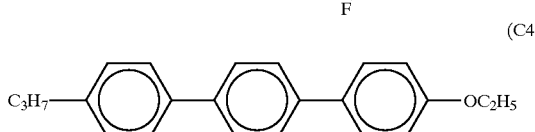
The chiral nematic liquid crystal compositions described above have the advantage that the pitch of their spiral structure may be changed by changing the amount of chiral agent added, thereby allowing the selective reflection wavelength of the liquid crystal to be controlled. Generally, the term used to describe the pitch of the spiral structure of the liquid crystal molecules is 'helical pitch', defined as the distance between liquid crystal molecules when they turn 360° along the spiral structure.

Chiral Agent

A chiral agent is an additive that has the effect of twisting the liquid crystal molecules when it is added to nematic liquid crystal. Adding a chiral agent to nematic liquid crystal causes the liquid crystal molecules to adopt a helical structure having a prescribed distance between spirals, thereby creating a cholesteric phase. The use of different kinds of chiral agents allows the phase shift temperature of the liquid crystal composition to be changed, mitigates the change in the selective reflection wavelength of the liquid crystal in response to changes in temperature, and allows physical properties of the liquid crystal such as the dielectric a cholesteric ring, such as cholesteric nonanoate, may be used as well. The chemical formulae (D1) through (D6) for the usable chiral agents are provided below.

Two or more chiral agents may be added. By adding multiple chiral agents, the selective reflection wavelength may be prevented from shifting due to changes in the ambient temperature. Where multiple chiral agents are added, two agents that cause the liquid crystal molecules to twist in opposite directions may be added.

The total amount of chiral agent added should comprise approximately 10% to 45% by weight of the total amount of the chiral nematic liquid crystal composition. If it is less than 10%, the liquid crystal composition may not be able to perform selective reflectance of light of the desired wavelength. If it exceeds 45%, a cholesteric phase may not be exhibited at room temperature, or the liquid crystal composition may solidify.

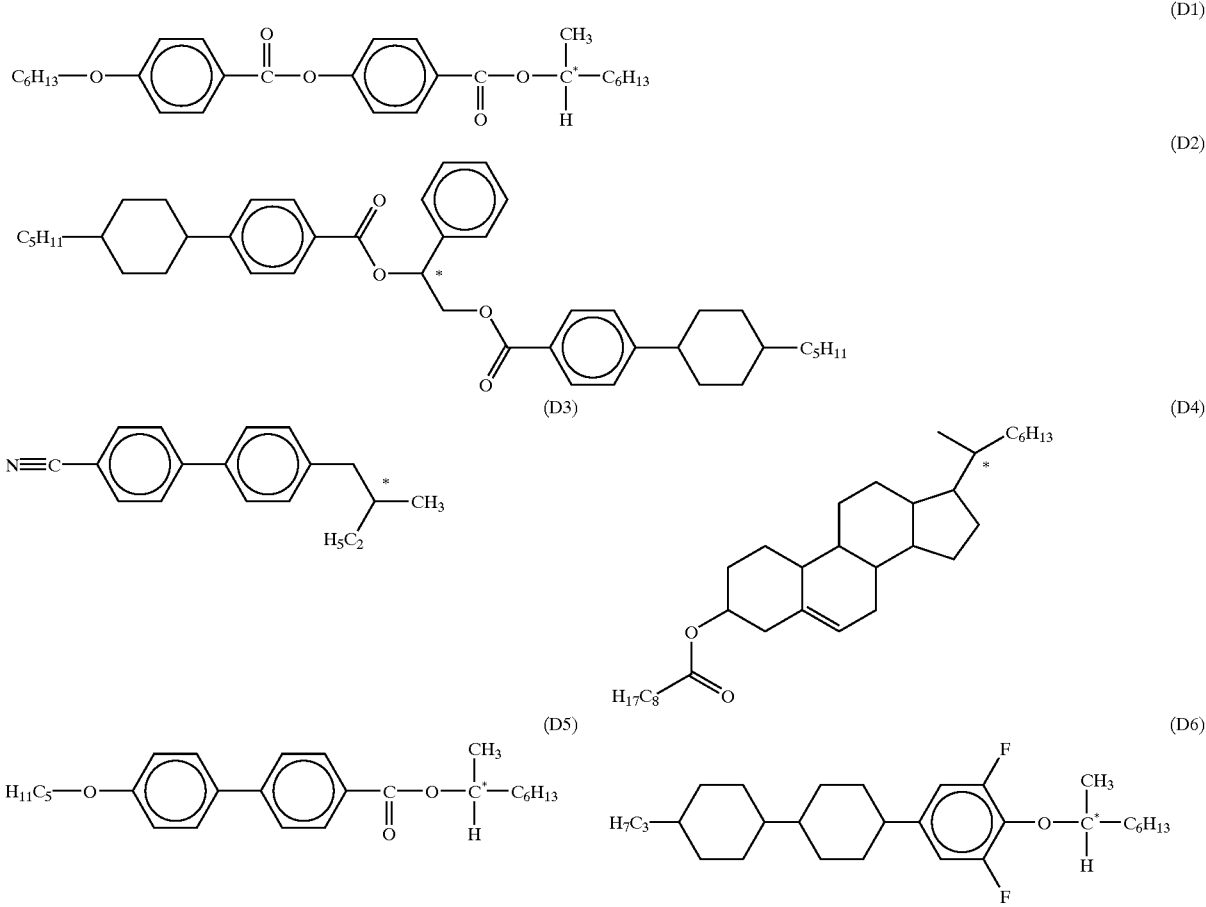

anisotropy, reflective anisotropy and viscosity to be varied, thereby improving the characteristics of the liquid crystal display.

The added chiral agent may comprise, for example, a biphenyl compound, a terphenyl compound, an ester compound, a pyrimidine compound, an azoxy compound, or another type of chiral agent. It may comprise a generally-marketed chiral agent having an optically active group for the end group of the compound, such as S811, R811, CB15, S1011, or R10011 (all manufactured by Merk & Co.), or such as CM31, CM32, CM33 or CM34 (all manufactured by Chisso Corp.) In addition, cholesteric liquid crystal having Pigment, UV-absorbent Substance The pigment added to the chiral nematic liquid crystal composition may comprise an azo compound, a quinone compound or an anthraquinone compound, or a dichroic pigment. Any of various publicly known pigments may be used, and they may be used individually or in combination. The amount of pigment should comprise no more than 5% by weight of the total amount of chiral nematic liquid crystal composition, but the preferred percentage is 3% or less.

Where a color filter is used instead of a pigment, a colorless transparent substance to which a pigment is added may be used as the filter substance. A substance that is fundamentally in a colored state without the addition of a pigment, or a film made of a substance that has the same effect as a pigment, may also be used. Needless to say, the same effect may be obtained by replacing the transparent substrate itself with the filter substance, instead of applying the filter as a separate layer.

The added UV-absorbent substance prevents deterioration of the liquid crystal composition due to UV exposure, such as color fading or deterioration in the responsiveness of the liquid crystal over time. A benzophenone compound, a benzotriazole compound, or a salicylate compound, for example, may be used. The added amount should comprise 5% or less by weight of the total amount of liquid crystal composition, but the preferred percentage is 3% or less.

Column-shaped Bodies

The structure of the column-shaped bodies will first be explained. The column-shaped bodies have a circular, square, or oval cross-section, and are aligned in a prescribed pattern, such as a lattice pattern, with a prescribed distance between them. Alternatively, they may be aligned in a striped configuration with a prescribed distance between them. It is preferable if the column-shaped bodies are not aligned randomly, but are placed at equal distances apart, or aligned such that the distance between them changes gradually, or such that a prescribed alignment pattern repeats itself at regular intervals, so that the distance between the substrates is maintained at an appropriate distance and the alignment does not serve to hinder the performance of image display by the liquid crystal.

Various publicly known methods for forming the column-shaped bodies may be adopted. In one method, for example, after a photo-curing resin substance is applied to the surface of the substrates, it is irradiated by light of a prescribed wavelength via a mask in which are formed openings having a desired pattern, whereby the photo-curing resin substance is polymerized and the unnecessary parts are removed. Alternatively, a method may be used in which the resin substance is transferred to the substrates by means of the screen printing method and thereafter cured and dried. In yet another method, a mixture of the chiral nematic liquid crystal composition and the photo-curing resin substance is applied to one of the substrates, the other substrate is placed on the first substrate, the mixture is irradiated by light of a prescribed wavelength via a mask in which are formed openings having a desired pattern, thereby polymerizing the photo-curing resin substance, and the column-shaped bodies are formed through phase separation of the mixture.

The chiral nematic liquid crystal composition may be placed between the substrates that sandwich the column-shaped bodies through vacuum injection. Alternatively, the liquid crystal composition may be applied to one of the substrates on which the column-shaped bodies are formed, the other substrate placed on top, and the liquid crystal composition made to spread out between them by pressing the substrates toward each other.

In the screen printing method, a screen in which a prescribed pattern (openings) is formed is placed on the substrate surface on which the electrodes are formed, and the resin substance is placed on the screen. A squeegee is then operated to travel at a prescribed pressure and speed. In this way, the resin substance is transferred to the substrate via the screen, whereupon it is heated, hardened and dried.

Where the column-shaped bodies are formed through the screen printing method, the resin substance is not limited to photo-curing resin, and a thermosetting resin such as epoxy resin or acrylic resin, or a thermoplastic resin, may also be used. Thermoplastic resins include polyvinyl chloride resin, polyvinylidene chloride resin, polyvinyl acetate resin, polymethacrylate ester resin, polyacrylate ester resin, polystyrene resin, polyamide resin, polyethylene resin, polypropylene resin, fluorine resin, polyurethane resin, polyacrylonitrile resin, polyvinyl ether resin, polyvinyl ketone resin, polyether resin, polyvinyl pyrrolidone resin, saturated polyester resin, polycarbonate resin, and chlorinated polyether resin. These resins are preferably dissolved in an appropriate solvent and used in the form of a paste.

After the column-shaped bodies are formed on the substrates, spacers are dispersed on at least one of the substrates, and the other substrate is placed on top such that the electrodes face each other, forming an empty cell. When doing so, by heating the pair of substrates while pressure is applied to both sides of the pair of substrates, the column-shaped bodies are softened, and may be hardened once more through cooling.

EXPERIMENT EXAMPLE 1

A nematic liquid crystal mixture including 48% by weight of the liquid crystal ester compounds described in structural formulae (A7), (A8), (A9), (A'22), (A'23) and (A'24), 20% by weight of the liquid crystal tolane compounds described in structural formulae (B9), (B41), (B42), (B43) and (B44), and 15% by weight of the liquid crystal terphenyl compound described in structural formula (C4) was used. This nematic liquid crystal mixture was mixed together with the chiral agent described in structural formula (D3) in the proportions of 78.5% and 21.5% by weight, respectively, creating a chiral nematic liquid crystal composition having a selective reflection wavelength of 550 nm. This chiral nematic liquid crystal composition had a reflective anisotropy value of 0.215, a dielectric anisotropy value of 19.2, and a phase shift temperature to an isotropic phase of 82.1° C.

Spacers were placed between glass substrates on which electrodes had been formed to adjust the distance between the substrates to 7 $\mu$m, and the chiral nematic liquid crystal composition was inserted between them. A black light-absorbing layer was mounted to the back side of the substrate opposite the substrate that the incident light strikes, thereby creating the liquid crystal display shown in FIG. 3.

In this liquid crystal display, when a 30V pulse voltage was impressed between the electrodes for 5 msec, the chiral nematic liquid crystal composition entered a focal conic state (transparent state), with a Y-value of 2.35. When a 55V pulse voltage was then impressed for 5 msec, the chiral nematic liquid crystal composition entered a planar state (green colored state), with a Y-value of 20.45 and a contrast of 8.70. The color purity under the planar state was 81.5%, and the reflectance under the planar state was 32.6%.

Measurement of the Y-value (luminous reflectance) and color purity (excitation purity) was performed using a spectrophotometric colorimeter CM3700d manufactured by Minolta Co., Ltd. The same equipment was used in the experiment examples and comparison examples described below.

EXPERIMENT EXAMPLE 2

A nematic liquid crystal mixture including 48% by weight of the liquid crystal ester compounds described in structural formulae (A7), (A8), (A9), (A'22), (A'23) and (A'24), 20% by weight of the liquid crystal tolane compounds described in structural formulae (B9), (B41), (B42), (B43) and (B44), and 15% by weight of the liquid crystal terphenyl compound described in structural formula (C4) was used. This nematic liquid crystal mixture was mixed together with the chiral agent described in structural formula (D3) in the proportions of 81.8% and 18.2% by weight, respectively, creating a chiral nematic liquid crystal composition having a selective reflection wavelength of 680 nm. This chiral nematic liquid crystal composition had a reflective anisotropy value of 0.206, a dielectric anisotropy value of 16.2, and a phase shift temperature to an isotropic phase of 78.8° C.

Spacers were placed between glass substrates on which electrodes had been formed to adjust the distance between the substrates to 9 μm, and the liquid crystal composition was inserted between them. A black light-absorbing layer was mounted to the back side of the substrate opposite the substrate that the incident light strikes, thereby creating the liquid crystal display shown in FIG. 3.

In this liquid crystal display, when a 35V pulse voltage was impressed between the electrodes for 5 msec, the chiral nematic liquid crystal composition entered a focal conic state (transparent state), with a Y-value of 1.40. When a 60V pulse voltage was then impressed for 5 msec, the liquid crystal composition entered a planar state (red colored state), with a Y-value of 6.80 and a contrast of 4.86. The color purity under the planar state was 69.5%, and the reflectance under the planar state was 31.5%.

EXPERIMENT EXAMPLE 3

A nematic liquid crystal mixture including 48% by weight of the liquid crystal ester compounds described in structural formulae (A7), (A8), (A9), (A'22), (A'23) and (A'24), 20% by weight of the liquid crystal tolane compounds described in structural formulae (B9), (B41), (B42), (B43) and (B44), and 15% by weight of the liquid crystal terphenyl compound described in structural formula (C4) was used. This nematic liquid crystal mixture was mixed together with the chiral agent described in structural formula (D6) in the proportions of 76.6% and 23.4% by weight, respectively, creating a chiral nematic liquid crystal composition having a selective reflection wavelength of 490 nm. This chiral nematic liquid crystal composition had a reflective anisotropy value of 0.215, a dielectric anisotropy value of 17.5, and a phase shift temperature to an isotropic phase of 78.9° C.

Spacers were placed between glass substrates on which electrodes had been formed to adjust the distance between the substrates to 5 μm, and the liquid crystal composition was inserted between them. A black light-absorbing layer was mounted to the back side of the substrate opposite the substrate that the incident light strikes, thereby creating the liquid crystal display shown in FIG. 3.

In this liquid crystal display, when a 20V pulse voltage was impressed between the electrodes for 5 msec, the liquid crystal composition entered a focal conic state (transparent state), with a Y-value of 2.01. When a 40V pulse voltage was then impressed for 5 msec, the liquid crystal composition entered a planar state (blue colored state), with a Y-value of 8.07 and a contrast of 4.01. The color purity under the planar state was 65.1%, and the reflectance under the planar state was 31.5%.

EXPERIMENT EXAMPLE 4

A nematic liquid crystal mixture including 42% by weight of the liquid crystal ester compound described in structural formulae (A6), (A7), (A8), (A'5), (A'22) and (A'24), 22% by weight of the liquid crystal tolane compound described in structural formulae (B9), (B11), (B40), (B42) and (B46), and 13% by weight of the liquid crystal terphenyl compound described in structural formulae (C2) and (C6) was used. This nematic liquid crystal mixture was mixed together with the chiral agent described in structural formula (D1) and SI-426 dichroic pigment (manufactured by Mitsui Toatsu Co., Ltd.) in the proportions of 80.1%, 19.4% and 0.5% by weight, respectively, creating a chiral nematic liquid crystal composition having a selective reflection wavelength of 690 nm. This chiral nematic liquid crystal composition had a reflective anisotropy value of 0.205, a dielectric anisotropy value of 15.4, and a phase shift temperature to an isotropic phase of 79.5° C.

This chiral nematic liquid crystal composition was mixed in a 3:7 ratio with R-684 UV-hardened type monomer (manufactured by Nippon Kayaku Co., Ltd.) that was previously mixed with 5% by weight of a polymerization initiator, and was placed between glass substrates on which electrodes had been formed and spacers having a diameter of 9 μm were sprayed. The mixture was irradiated with UV light while the gap between the substrates was maintained at a specified distance. A black light-absorbing layer was mounted to the back side of the substrate opposite the substrate that the incident light strikes, thereby creating the liquid crystal display shown in FIG. 2.

In this liquid crystal display, when a 45V pulse voltage was impressed between the electrodes for 5 msec, the liquid crystal composition entered a focal conic state (transparent state), with a Y-value of 1.32. When a 75V pulse voltage was then impressed for 5 msec, the liquid crystal composition entered a planar state (red colored state), with a Y-value of 6.43 and a contrast of 4.87. The color purity undre the planar state was 75.2%, and the reflectance under the planar state was 33.5%.

EXPERIMENT EXAMPLE 5

A nematic liquid crystal mixture including 42% by weight of the liquid crystal ester compounds described in structural formulae (A6), (A7), (A8), (A'5), (A'22) and (A'24), 22% by weight of the liquid crystal tolane compounds described in structural formulae (B9), (B11), (B40), (B42) and (B46), and 13% by weight of the liquid crystal terphenyl compounds described in structural formulae (C2) and (C6) was used. This nematic liquid crystal mixture was mixed together with the chiral agent described in structural formula (D6) and Kayaset yellow GN pigment (manufactured by Nippon Kayaku Co., Ltd.) in the proportions of 19.2%, 20.5% and 0.3% by weight, respectively, creating a chiral nematic liquid crystal composition having a selective reflection wavelength of 550 nm. This chiral nematic liquid crystal composition had a reflective anisotropy value of 0.189, a dielectric anisotropy value of 15.3, and a phase shift temperature to an isotropic phase of 83.2° C.

This chiral nematic liquid crystal composition was mixed in a 3:7 ratio with R-684 UV-hardened type monomer (manufactured by Nippon Kayaku Co., Ltd.) that was previously mixed with 5% by weight of a polymerization initiator, and was placed between glass substrates on which electrodes had been formed and spacers having a diameter of 7 μm were sprayed. The mixture was irradiated with UV light while the gap between the substrates was maintained at a specified distance. A black light-absorbing layer was mounted to the back side of the substrate opposite the substrate that the incident light strikes, thereby creating the liquid crystal display shown in FIG. 2.

In this liquid crystal display, when a 45V pulse voltage was impressed between the electrodes for 5 msec, the liquid crystal composition entered a focal conic state (transparent state), with a Y-value of 2.12. When a 65V pulse voltage was then impressed for 5 msec, the liquid crystal composition entered a planar state (green colored state), with a Y-value of 21.1 and a contrast of 9.95. The color purity under the planar state was 84.6%, and the reflectance under the planar state was 31.5%.

EXPERIMENT EXAMPLE 6

A nematic liquid crystal mixture including 42% by weight of the liquid crystal ester compounds described in structural formulae (A6), (A7), (A8), (A'5), (A'22) and (A'24), 22% by weight of the liquid crystal tolane compounds described in structural formulae (B9), (B11), (B40), (B42) and (B46), and 13% by weight of the liquid crystal terphenyl compounds described in structural formulae (C2) and (C6) was used. This nematic liquid crystal mixture was mixed together with the chiral agent described in structural formula (D6) and MBT-175 UV-absorbing agent (manufactured by Nippon Kayaku Co., Ltd.) in the proportions of 74.1%, 25.4% and 0.5% by weight, respectively, creating a chiral nematic liquid crystal composition having a selective reflection wavelength of 475 nm. This chiral nematic liquid crystal composition had a reflective anisotropy value of 0.178, a dielectric anisotropy value of 14.8, and a phase shift temperature to an isotropic phase of 84.1° C.

Spacers were placed between glass substrates on which electrodes had been formed to adjust the distance between the substrates to 5 μm, and the chiral nematic liquid crystal composition was inserted between them. A black light-absorbing layer was mounted to the back side of the substrate opposite the substrate that the incident light strikes, thereby creating the liquid crystal display shown in FIG. 3.

In this liquid crystal display, when a 30V pulse voltage was impressed between the electrodes for 5 msec, the liquid crystal composition entered a focal conic state (transparent state), with a Y-value of 1.68. When a 50V pulse voltage was then impressed for 5 msec, the liquid crystal composition entered a planar state (blue colored state), with a Y-value of 7.56 and a contrast of 4.50. The color purity under the planar state was 70.2%, and the reflectance under the planar state was 30.9%.

EXPERIMENT EXAMPLE 7

A nematic liquid crystal mixture including 53% by weight of the liquid crystal ester compounds described in structural formulae (A2), (A7), (A8), (A9), (A63), (A'22), (A'23), (A'24) and (A'27), 22% by weight of the liquid crystal tolane compounds described in structural formulae (B11), (B41), (B42) and (B44), 10% by weight of the liquid crystal terphenyl compound described in structural formula (C4), and 7% by weight of the liquid crystal phenyl cyclohexyl compounds described in the following structural formulae (E1) and (E2) was used. This nematic liquid crystal mixture was mixed together with the chiral agent described in structural formula (D3) in the proportions of 71.5% and 28.5% by weight, respectively, creating a chiral nematic liquid crystal composition having a selective reflection wavelength of 480 nm. This chiral nematic liquid crystal composition had a reflective anisotropy value of 0.208, a dielectric anisotropy value of 19.5, and a phase shift temperature to an isotropic phase of 76.1° C.

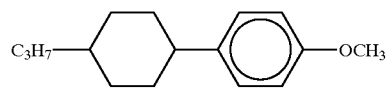
(E1)

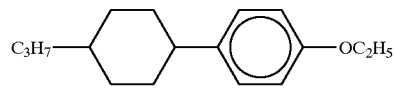
(E2)

Spacers were placed between glass substrates on which electrodes had been formed to adjust the distance between the substrates to 5 μm, and the liquid crystal composition was inserted between them. A black light-absorbing layer was mounted to the back side of the substrate opposite the substrate that the incident light strikes, thereby creating the liquid crystal display shown in FIG. 3.

In this liquid crystal display, when a 20V pulse voltage was impressed between the electrodes for 5 msec, the liquid crystal composition entered a focal conic state (transparent state), with a Y-value of 1.72. When a 40V pulse voltage was then impressed for 5 msec, the chiral nematic liquid crystal composition entered a planar state (blue colored state), with a Y-value of 7.87 and a contrast of 4.58. The color purity under the planar state was 64.3%, and the reflectance under the planar state was 32.5%.

Comparison Example 1

A nematic liquid crystal mixture including 56% by weight of the liquid crystal ester compounds described in structural formulae (A7), (A8), (A9), (A'13) and (A'14), as well as in the following structural formulae (A70), (A71), (A'41) and (A'42) described below, 10% by weight of the liquid crystal tolane compounds described in structural formulae (B40), (B41) and (B43), and none of the liquid crystal terphenyl compound, was used. This nematic liquid crystal mixture was mixed together with the chiral agent described in structural formula (D1) and SI-426 dichroic pigment (manufactured by Mitsui Toatsu Co., Ltd.) in the proportions of 77.7%, 21.8% and 0.5% by weight, respectively, creating a chiral nematic liquid crystal composition having a selective reflection wavelength of 680 nm. This chiral nematic liquid crystal composition had a reflective anisotropy value of 0.135, a dielectric anisotropy value of 12.8, and a phase shift temperature to an isotropic phase of 78.1° C.

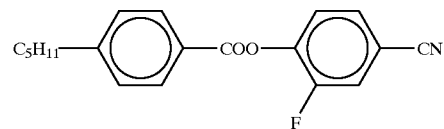
(A70)

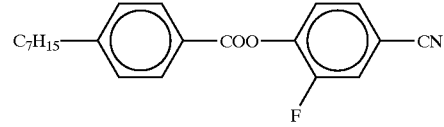
(A71)

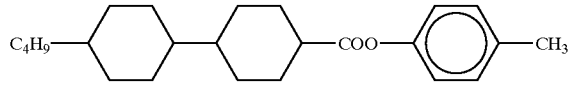
(A'41)

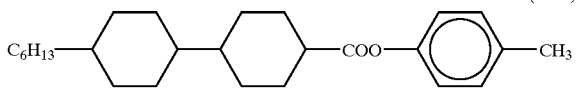
(A'42)

Spacers were placed between glass substrates on which electrodes had been formed to adjust the distance between the substrates to 9 μm, and the chiral nematic liquid crystal composition was inserted between them. A black light-absorbing layer was mounted to the back side of the substrate opposite the substrate that the incident light strikes, thereby creating the liquid crystal display shown in FIG. 3.

In this liquid crystal display, when a 60V pulse voltage was impressed between the electrodes for 5 msec, the chiral nematic liquid crystal composition entered a focal conic state (transparent state), with a Y-value of 1.18. When a 90V pulse voltage was then impressed for 5 msec, the liquid crystal composition entered a planar state (red colored state), with a Y-value of 3.51 and a contrast of 2.97. The color purity under the planar state was 63.7%, and the reflectance under the planar state was 23.3%.

Comparison Example 2

A nematic liquid crystal mixture including 15% by weight of the liquid crystal tolane compounds described in structural formulae (B9), (B41) and (B42), 35% by weight of the liquid crystal terphenyl compounds described in structural formulae (C3), (C4) and (C5), as well as in the following structural formulae (C49) and (C50) described below, and none of the liquid crystal ester compound, was used. This nematic liquid crystal mixture was mixed together with the chiral agent described in structural formula (D2) in the proportions of 84.4% and 15.6% by weight, respectively, creating a chiral nematic liquid crystal composition having a selective reflection wavelength of 550 nm. This chiral nematic liquid crystal composition had a reflective anisotropy value of 0.220, a dielectric anisotropy value of 13.8, and a phase shift temperature to an isotropic phase of 82.1° C.

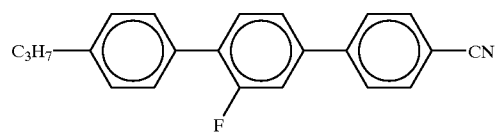

(C49)

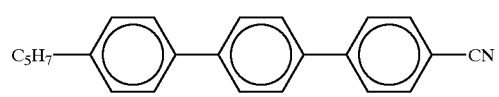

(C50)

Spacers were placed between glass substrates on which electrodes had been formed to adjust the distance between the substrates to 7 μm, and the chiral nematic liquid crystal composition was inserted between them. A black light-absorbing layer was mounted to the back side of the substrate opposite the substrate that the incident light strikes, thereby creating the liquid crystal display shown in FIG. 3.

In this liquid crystal display described above, when a 60V pulse voltage was impressed between the electrodes for 5 msec, the chiral nematic liquid crystal composition entered a focal conic state (transparent state), with a Y-value of 5.21. When a 90V pulse voltage was then impressed for 5 msec, the chiral nematic liquid crystal composition entered a planar state (green colored state), with a Y-value of 24.62 and a contrast of 4.73. The color purity under the planar state was 54.4%, and the reflectance under the planar state was 34.0%.

Comparison Example 3

A nematic liquid crystal mixture including 49% by weight of the liquid crystal ester compounds described in structural formulae (A7), (A8), (A9), (A'22), (A'23) and (A'24), 35% by weight of the liquid crystal terphenyl compounds described in structural formulae (C3), (C4) and (C48), and none of the liquid crystal tolane compound, was used. This nematic liquid crystal mixture was mixed together with a combination of the chiral agents described in structural formulae (D6) and (D1), in the proportions of 78.9% and 21.1% by weight, respectively, for the purpose of creating a chiral nematic liquid crystal composition having a selective reflection wavelength of 550 nm. This liquid crystal composition did not exhibit a cholesteric phase at room temperature, and a smectic phase appeared instead.

OTHER EMBODIMENTS

The liquid crystal composition and liquid crystal light modulating element pertaining to the present invention are not limited to the examples described in the embodiments and the experiment examples, and may be varied within the essential scope of the invention.

In particular, various constructions may be adopted for the liquid crystal light modulating element. Furthermore, the specific components of the liquid crystal compositions described in the embodiments and the experiment examples were examples only.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be constructed as being included therein.

What is claimed is:

1. A chiral nematic liquid crystal composition comprising:
   a nematic liquid crystal composition including at least one kind of liquid crystal ester compound, at least one kind of liquid crystal terphenyl compound, and at least one kind of liquid crystal tolane compound; and
   at least one kind of chiral agent,
   wherein the chiral nematic liquid crystal composition exhibits a cholesteric phase at room temperature.

2. A chiral nematic liquid crystal composition as claimed in claim 1, wherein the liquid crystal ester compound includes an F group or a CN group therein.

3. A chiral nematic liquid crystal composition as claimed in claim 1, wherein the liquid crystal terphenyl compound includes a polar group therein.

4. A chiral nematic liquid crystal composition as claimed in claim 3, wherein the polar group includes an F group or a Cl group.

5. A chiral nematic liquid crystal composition as claimed in claim 1, wherein a total of the liquid crystal ester compound and the liquid crystal terphenyl compound is at least 50% by weight of the nematic liquid crystal composition.

6. A chiral nematic liquid crystal composition as claimed in claim 5, wherein the liquid crystal terphenyl compound is at least 10% by weight of the nematic liquid crystal composition.

7. A chiral nematic liquid crystal composition as claimed in claim 5, wherein the liquid crystal ester compound is at least 30% by weight of the nematic liquid crystal composition.

8. A chiral nematic liquid crystal composition as claimed in claim 1, said nematic liquid crystal composition further comprising a liquid crystal phenyl cyclohexyl compound.

9. A chiral nematic liquid crystal composition as claimed in claim 1, wherein the chiral agent contained in the chiral nematic liquid crystal composition is in a range from 10% to 45% by weight of a total the chiral nematic liquid crystal composition.

10. A chiral nematic liquid crystal composition as claimed in claim 1, wherein the nematic liquid crystal composition has a dielectric anisotropy value in a range from 10 to 30.

11. A chiral nematic liquid crystal composition as claimed in claim 10, wherein the dielectric anisotropy of the nematic liquid crystal composition is in a range from 15 to 30.

12. A chiral nematic liquid crystal as claimed in claim 1, wherein the nematic liquid crystal composition has a refractive anisotropy value in a range from 0.1 to 0.3.

13. A chiral nematic liquid crystal as claimed in claim 1, wherein the refractive anisotropy value of the nematic liquid crystal composition is in a range from 0.15 to 0.25.

14. A chiral nematic liquid crystal composition as claimed in claim 1, further comprising at least one kind of pigment.

15. A chiral nematic liquid crystal composition as claimed in claim 1, further comprising at least one kind of UV-absorbent substance.

16. A chiral nematic liquid crystal composition as claimed in claim 1, wherein the chiral nematic liquid crystal composition exhibits a bistability under no electrical field condition.

17. A liquid crystal light control device comprising:
a pair of substrates;
a liquid crystal light control layer disposed between the pair of substrates, the liquid crystal light control layer including a chiral nematic liquid crystal composition exhibiting a cholesteric phase at room temperature, the chiral nematic liquid crystal composition comprising a nematic liquid crystal composition and at least one kind of chiral agent, the nematic liquid crystal composition including at least one kind of liquid crystal ester compound, at least one kind of liquid crystal terphenyl compound, and at least one kind of liquid crystal tolane compound.

18. A liquid crystal light control device as claimed in claim 17, wherein the chiral nematic liquid crystal composition exhibits a bistability under no electrical field condition.

19. A liquid crystal light control device as claimed in claim 18, wherein the chiral nematic liquid crystal composition is capable of keeping either of a planar state and a focal conic state under the no field condition.

20. A liquid crystal light control device as claimed in claim 19, wherein the chiral nematic liquid crystal is switched between the planer state and the focal conic state by applying an electrical field thereto.

* * * * *

UNITED STATES PATENT AND TRADEMARK OFFICE
CERTIFICATE OF CORRECTION

PATENT NO. : 6,461,693 B1  
DATED : October 8, 2002  
INVENTOR(S) : Masako Iwamatsu et al.

It is certified that error appears in the above-identified patent and that said Letters Patent is hereby corrected as shown below:

Title page,
Item [57], ABSTRACT,
Line 1, after "composition", delete ",".
Line 2, delete the first instance of "a".
Line 2, delete "comprising" and insert -- includes --.

Column 1,
Line 33, after "information", insert -- , --.
Line 33, after "text", insert -- , --.
Line 63, after "composition", insert -- , --.

Column 7,
Line 41, delete "R", and insert -- R1 --.
Line 49, after "in", insert -- a --.

Column 22,
Line 23, delete the following chemical formula:

and insert the following chemical formula therefor: 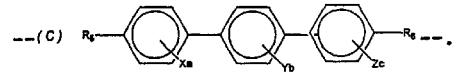

Line 30, delete "interger", and insert -- integer --.

Column 34,
Line 17, delete "a40V", and insert -- a 40V --.

Column 37,
Line 4, delete "a total".

Signed and Sealed this

Sixth Day of April, 2004

JON W. DUDAS
*Acting Director of the United States Patent and Trademark Office*